United States Patent
Balzano et al.

(10) Patent No.: US 12,358,580 B1
(45) Date of Patent: Jul. 15, 2025

(54) VEHICLE DISASSEMBLY SYSTEM AND METHOD

(71) Applicant: EMR (USA Holdings) Inc., Bellmawr, NJ (US)

(72) Inventors: Joseph Balzano, Bellmawr, NJ (US); Deepak Mulay, Bellmawr, NJ (US); Cody Heisey, Denver, PA (US); Mark J. Petri, Cherry Hill, NJ (US)

(73) Assignee: EMR (USA Holdings) Inc., Bellmawr, NJ (US)

( * ) Notice: Subject to any disclaimer, the term of this patent is extended or adjusted under 35 U.S.C. 154(b) by 0 days.

(21) Appl. No.: 18/656,068

(22) Filed: May 6, 2024

Related U.S. Application Data

(63) Continuation of application No. 18/117,892, filed on Mar. 6, 2023, now Pat. No. 11,975,779, which is a
(Continued)

(51) Int. Cl.
  *B62D 67/00* (2006.01)
  *B23P 19/04* (2006.01)
  *B62D 65/00* (2006.01)

(52) U.S. Cl.
  CPC ............ *B62D 67/00* (2013.01); *B23P 19/042* (2013.01); *B62D 65/00* (2013.01)

(58) Field of Classification Search
  CPC ........ B62D 67/00; B62D 65/00; B23P 19/042
  See application file for complete search history.

(56) References Cited

U.S. PATENT DOCUMENTS 3,153,419 A * 10/1964 Weathers ................. C23G 3/00
  134/133
3,917,239 A * 11/1975 Rhinehart ............... F23G 7/005
  110/235
(Continued)

FOREIGN PATENT DOCUMENTS

CN 101734306 B 8/2011
CN 103112519 A * 5/2013
(Continued)

*Primary Examiner* — Bayan Salone
(74) *Attorney, Agent, or Firm* — Jones Walker LLP

(57) ABSTRACT

A vehicle disassembly system for disassembling a vehicle by moving the vehicle through a plurality of discrete workstations specifically adapted for select de-pollution and dismantling procedures encountered during the end-of-life vehicle recycling process. A vehicle disassembly system exemplifying the principles of the present invention may comprise a primary de-pollution and disassembly line and an engine disassembly line. The primary de-pollution and disassembly line may include one or more de-pollution stations, one or more intermediate, part removal stations, and a conveyor apparatus for transmitting the end-of-life vehicle from the de-pollution stations to the part removal stations. The engine disassembly line may include an overhead track support frame, a trolley assembly, one or more height adjustable loading tables, one or more height adjustable work tables, and one or more height adjustable un-loading tables. The vehicle disassembly system may also comprise an engine cleaning apparatus positioned proximate to the height adjustable un-loading tables of the engine disassembly line.

20 Claims, 34 Drawing Sheets

Related U.S. Application Data continuation of application No. 17/677,062, filed on Feb. 22, 2022, now Pat. No. 11,597,459, which is a continuation of application No. 16/517,174, filed on Jul. 19, 2019, now Pat. No. 11,279,425.

(60) Provisional application No. 62/803,969, filed on Feb. 11, 2019, provisional application No. 62/701,369, filed on Jul. 20, 2018.

(56) References Cited

U.S. PATENT DOCUMENTS

| | | | |
|---|---|---|---|
| 4,014,681 A | 3/1977 | Rhinehart | |
| 4,037,302 A * | 7/1977 | Hollander | B65G 37/02 |
| | | | 29/426.3 |
| 4,365,383 A * | 12/1982 | Bartlett | F16K 11/044 |
| | | | 15/312.1 |
| 4,905,363 A * | 3/1990 | Boyenval | B09B 5/00 |
| | | | 414/222.03 |
| 5,335,406 A * | 8/1994 | Van Den Mosselaar | |
| | | | B60S 13/00 |
| | | | 29/426.3 |
| 6,571,693 B1 * | 6/2003 | Kaldenberg | B30B 9/32 |
| | | | 100/95 |
| 6,594,877 B2 | 7/2003 | Mori et al. | |
| 6,722,023 B2 | 4/2004 | Mori et al. | |
| 6,732,417 B2 * | 5/2004 | Kaburagi | G06Q 10/04 |
| | | | 29/714 |
| 7,493,683 B2 * | 2/2009 | Davidyan | B62D 67/00 |
| | | | 29/426.1 |
| 7,703,345 B2 * | 4/2010 | Lee | G06Q 10/06 |
| | | | 73/865.9 |
| 11,279,425 B1 * | 3/2022 | Balzano | B62D 65/00 |
| 2001/0035102 A1 * | 11/2001 | Mori | B09B 3/00 |
| | | | 100/35 |
| 2005/0193541 A1 * | 9/2005 | Davidyan | B62D 67/00 |
| | | | 29/426.3 |
| 2005/0210650 A1 * | 9/2005 | Lee | B62D 67/00 |
| | | | 29/710 |
| 2007/0124906 A1 * | 6/2007 | Jin | B62D 67/00 |
| | | | 29/403.1 |
| 2008/0105638 A1 * | 5/2008 | Crawford | B66C 1/62 |
| | | | 212/180 |
| 2009/0320258 A1 * | 12/2009 | Davidyan | B62D 67/00 |
| | | | 29/283 |

FOREIGN PATENT DOCUMENTS

| | | | | |
|---|---|---|---|---|
| CN | 102530125 B | | 10/2013 | |
| CN | 203581175 U | | 5/2014 | |
| CN | 102849146 B | | 11/2014 | |
| CN | 104176153 A | * | 12/2014 | |
| CN | 204021049 U | | 12/2014 | |
| CN | 104527842 A | * | 4/2015 | B62D 67/00 |
| CN | 103112519 B | | 11/2015 | |
| CN | 205010369 U | | 2/2016 | |
| CN | 104176153 B | | 7/2016 | |
| CN | 205769700 U | | 12/2016 | |
| CN | 205837011 U | * | 12/2016 | |
| CN | 104527842 B | | 1/2017 | |
| CN | 106378354 A | * | 2/2017 | B09B 3/00 |
| CN | 106743324 A | | 5/2017 | |
| CN | 206171614 U | | 5/2017 | |
| CN | 106807722 A | | 6/2017 | |
| DE | 4333632 A1 | * | 4/1995 | B09B 3/0058 |
| EP | 2620356 B1 | | 7/2016 | |
| GB | 1525848 A | * | 9/1978 | B62D 65/00 |
| JP | H1178810 | | 3/1999 | |
| JP | H1178810 A | * | 3/1999 | |
| KR | 101514381 B1 | | 4/2015 | |
| WO | 2005080015 A1 | | 9/2005 | |

* cited by examiner

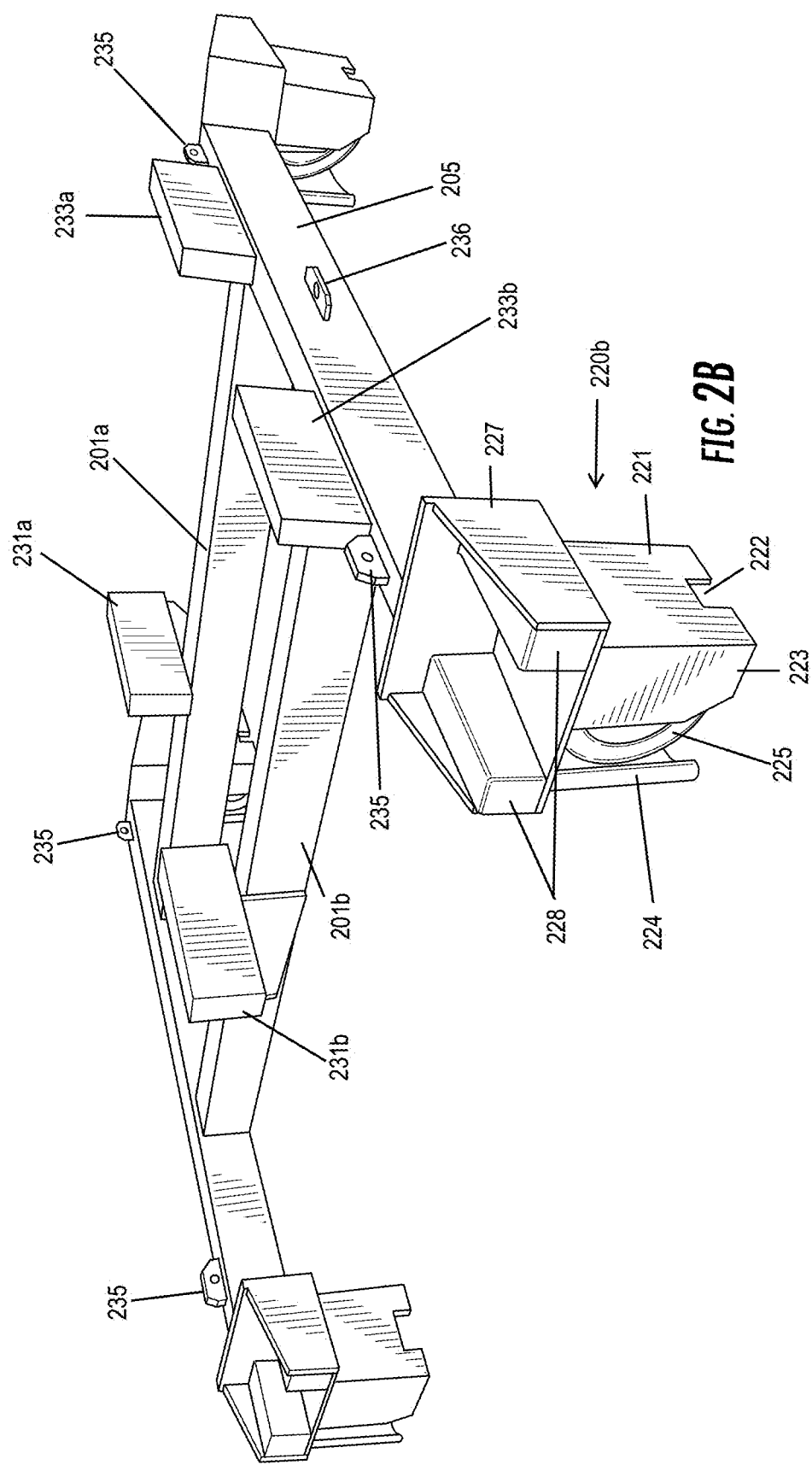

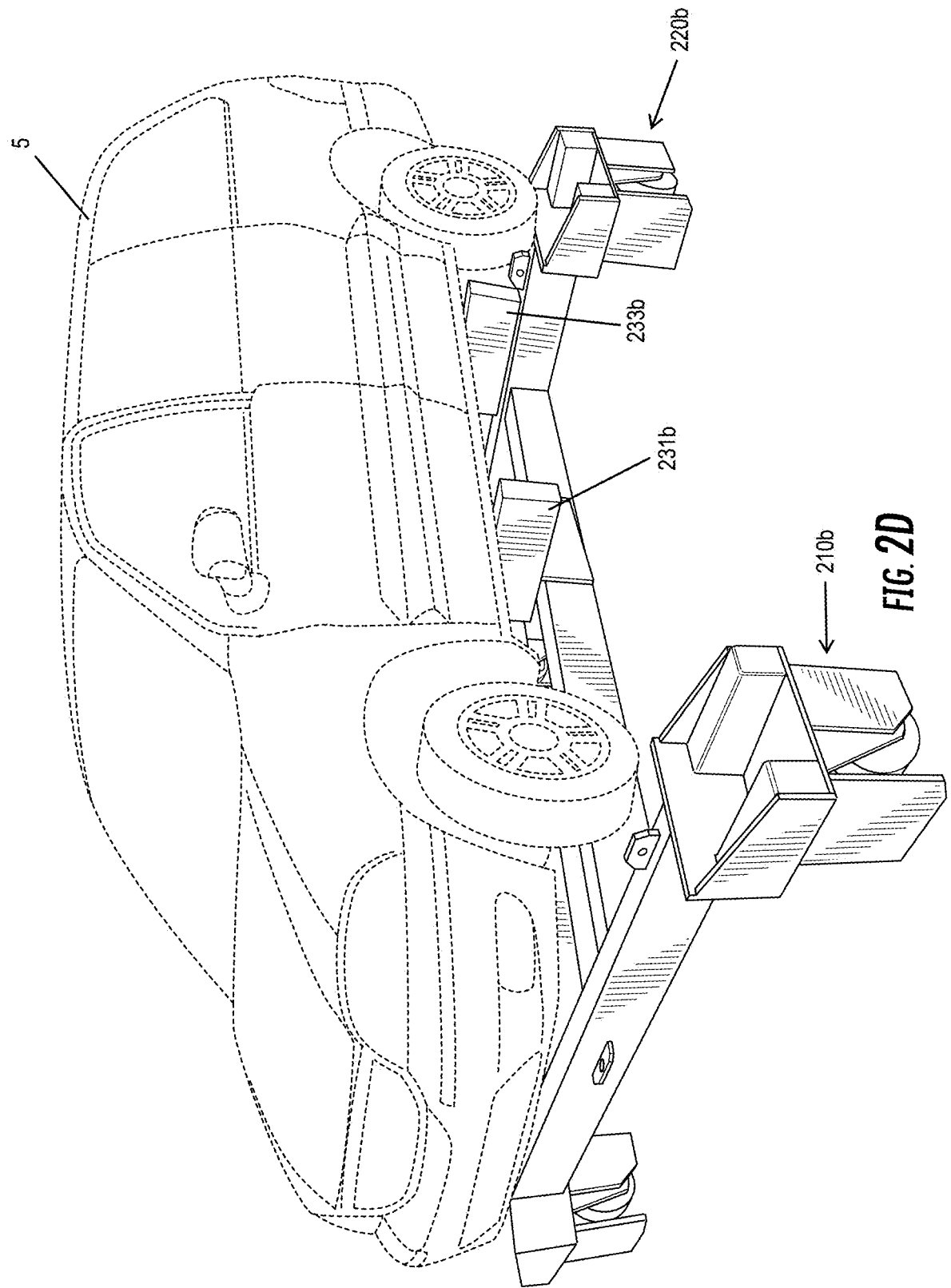

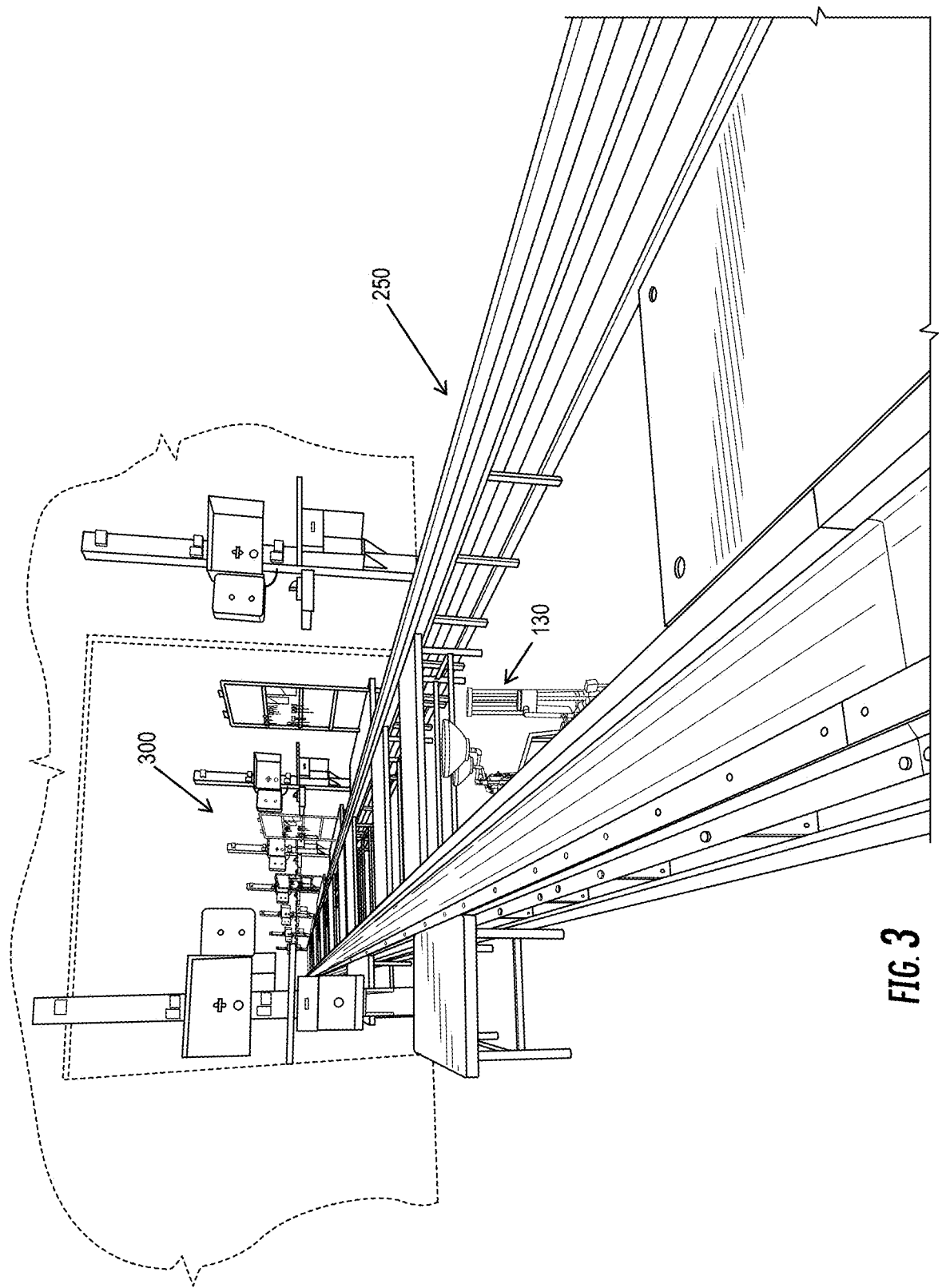

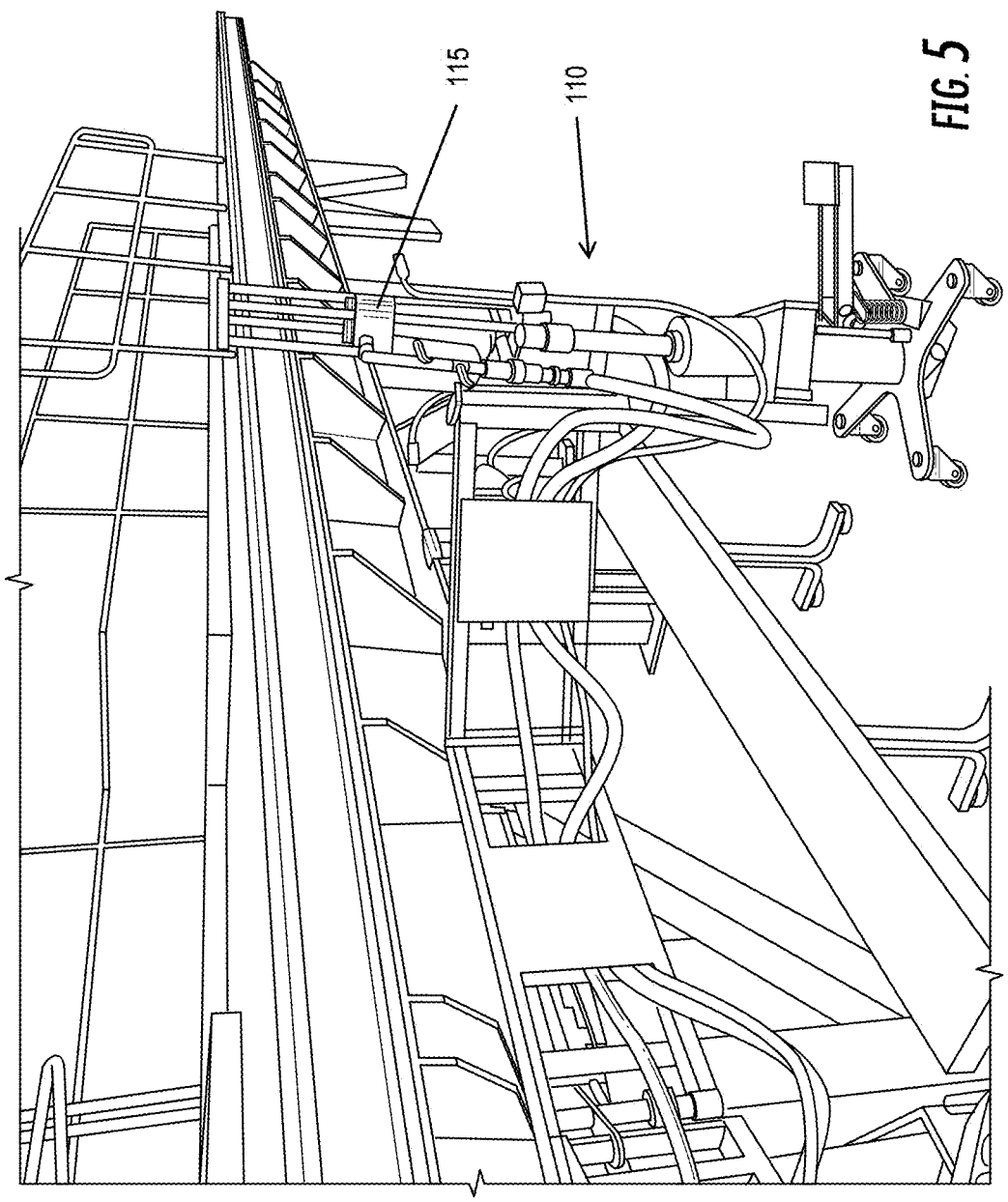

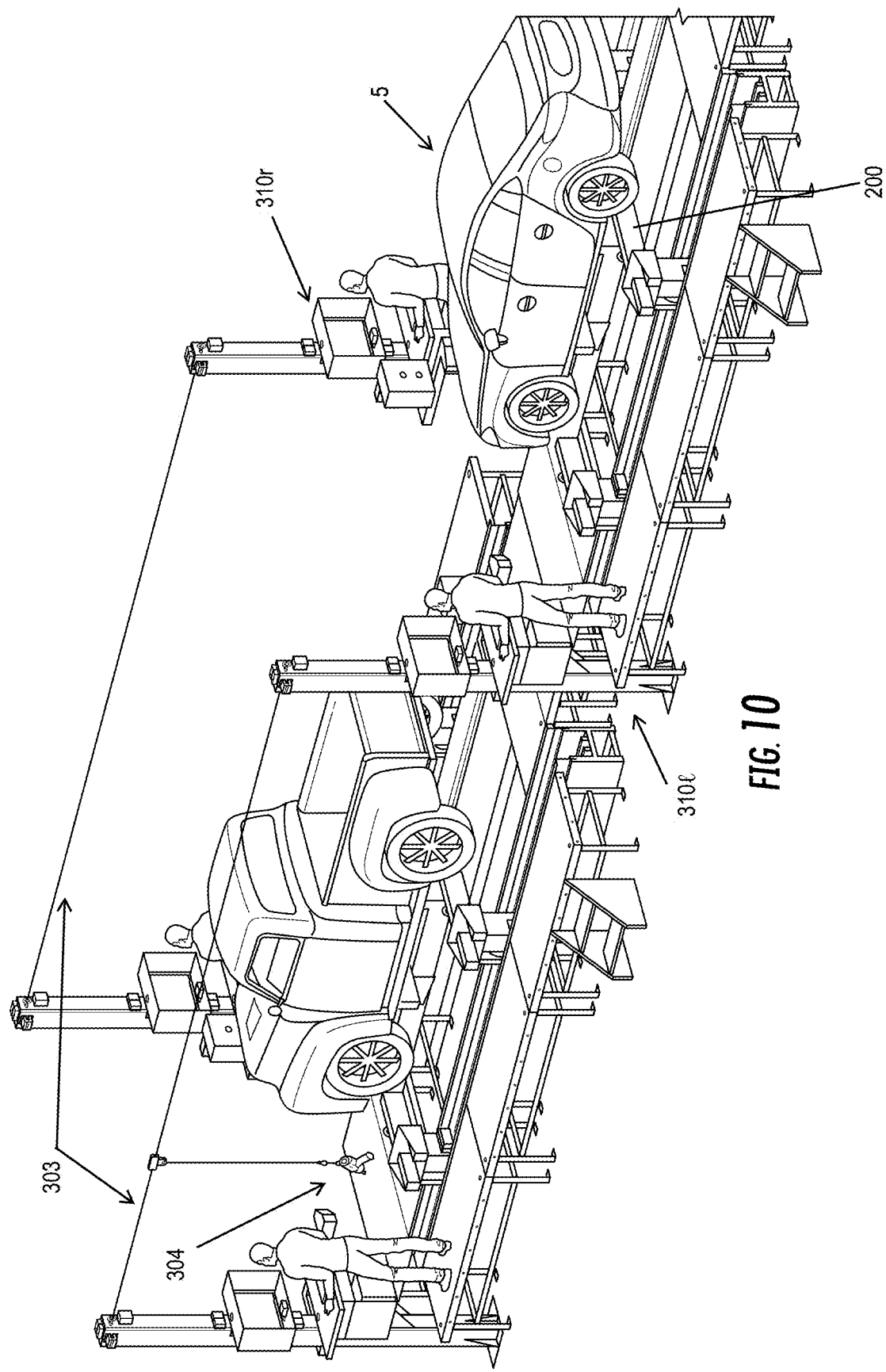

VEHICLE DISASSEMBLY SYSTEM AND METHOD

CROSS REFERENCE TO RELATED APPLICATIONS

This application is a continuation of U.S. Ser. No. 18/117,892 filed on Mar. 6, 2023, which is a continuation of U.S. Ser. No. 17/677,062 filed on Feb. 22, 2022 and issued as U.S. Pat. No. 11,597,459, which is a continuation of U.S. Ser. No. 16/517,174 filed on Jul. 19, 2019 and issued as U.S. Pat. No. 11,279,425, which claims the benefit of and priority to U.S. Provisional Application Ser. Nos. 62/701,369 and 62/803,969 filed on Jul. 20, 2018 and Feb. 11, 2019, respectively. Each of the foregoing applications are incorporated by reference herein in their entireties.

BACKGROUND

End of life vehicles (ELVs) are vehicles that have come to the end of their useful lives. ELVs are typically disassembled and recycled for waste management, environmental, and economic reasons. The ELV recycling process involves de-polluting the vehicle by removing fluids, tires, the battery, and any other hazardous substances, dismantling any reusable vehicle parts, and then shredding the vehicle to recycle ferrous and non-ferrous metals.

The conventional ELV recycling process typically takes place at a scrap yard, with the de-pollution and dismantling processes being undertaken at a single location while the ELV is mounted on a vehicle lift. Once completed, the ELV will be moved to another location at the scrap yard to await shredding. This procedure will be repeated in an iterative fashion, with a different ELV being mounted on the vehicle lift so that the de-pollution and dismantling procedures can be repeated throughout the day.

The use of a vehicle disassembly line has been conceptualized as a tool for increasing the efficiency of the ELV dismantling process. However, such known vehicle disassembly systems have suffered from a variety of issues that have negatively impacted their commercial viability, such as the complexity of the machinery necessary to execute the system. Moreover, such systems have failed to comprehensively address the myriad of logistical, economic, and environmental challenges posed by the ELV recycling process.

SUMMARY OF THE INVENTION

The invention disclosed herein is generally directed to a vehicle disassembly system capable of disassembling a vehicle in an efficient, comprehensive, and environmentally friendly manner by moving the vehicle through a plurality of discrete workstations specifically adapted for select de-pollution and dismantling procedures encountered during the ELV recycling process. The vehicle disassembly system of the present invention provides a comprehensive solution to the ELV recycling process that improves efficiency and reduces environmental pollution.

A vehicle disassembly system exemplifying the principles of the present invention may comprise a primary de-pollution and disassembly line. The primary de-pollution and disassembly line may include a conveyor apparatus, a vehicle cart, one or more greening stations, and one or more intermediate, part removal stations. The conveyor apparatus may include a conveyor track extending along the dismantling and de-pollution line, with the vehicle cart being configured to be mounted to the conveyor track in a manner allowing the vehicle cart to be transferred along the length of the conveyor track. The greening station(s) may have one or more fluid removal machines adapted to recover vehicle fluids found in ELVs. A plurality of fluid removal lines can be used to fluidly connect each fluid removal machine to a storage tank for collecting, storing, and recycling each recovered vehicle fluid. The part removal stations may include an upright post, a work surface attached to the post, and a bumper extending from the post and positioned to prevent contact between the work surface and an open vehicle door.

A vehicle disassembly system exemplifying the principles of the present invention may further comprise an engine disassembly line. The engine disassembly line may include an overhead track support frame, a trolley assembly, one or more height adjustable loading tables, and one or more height adjustable work tables. The overhead track support frame may include a first track extending along the support frame. The trolley assembly may be suspended from and configured to move along the first track. The one or more height adjustable loading tables may be positioned below the first track and configured to allow an engine on the adjustable loading table to be secured to the trolley assembly. The one or more plurality of height adjustable work tables may be positioned along the track and beyond the adjustable loading table.

In further embodiments, a vehicle disassembly system exemplifying the principles of the present invention may also comprise an engine cleaning apparatus that includes a roller conveyor, a main enclosure, an open inspection zone, and a secondary enclosure. The roller conveyor may have a first end and a second end. The main enclosure may extend along the roller conveyor and may include a washing zone, a drip zone, and a first dryer zone. The secondary enclosure may be positioned along the roller conveyor between the second end of the roller conveyor and the main enclosure.

The above summary is not intended to describe each illustrated embodiment or every possible implementation. It is not an exhaustive overview of the details disclosed herein. Nor is it intended to identify key or critical elements of the invention or to delineate the scope of the invention. These and other features, aspects, and advantages of the subject matter of this disclosure will become better understood in view of the following description, drawings, and claims.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to illustrate and to explain various principles and advantages in accordance with the present invention:

FIGS. 2A-2D are perspective views of one embodiment of a vehicle cart in accordance with disclosed aspects and features.

FIG. 3 is a front perspective view of an embodiment of a conveyor apparatus, a greening station, and a part removal station portion in accordance with disclosed aspects and features.

FIG. 5 is a perspective view of one embodiment of a first greening station in accordance with disclosed aspects and features.

FIG. 10 is a perspective view of a plurality of part removal stations in a part removal portion of a disassembly line in accordance with disclosed aspects and features.

DETAILED DESCRIPTION OF SELECTED EMBODIMENTS

Figure 1:
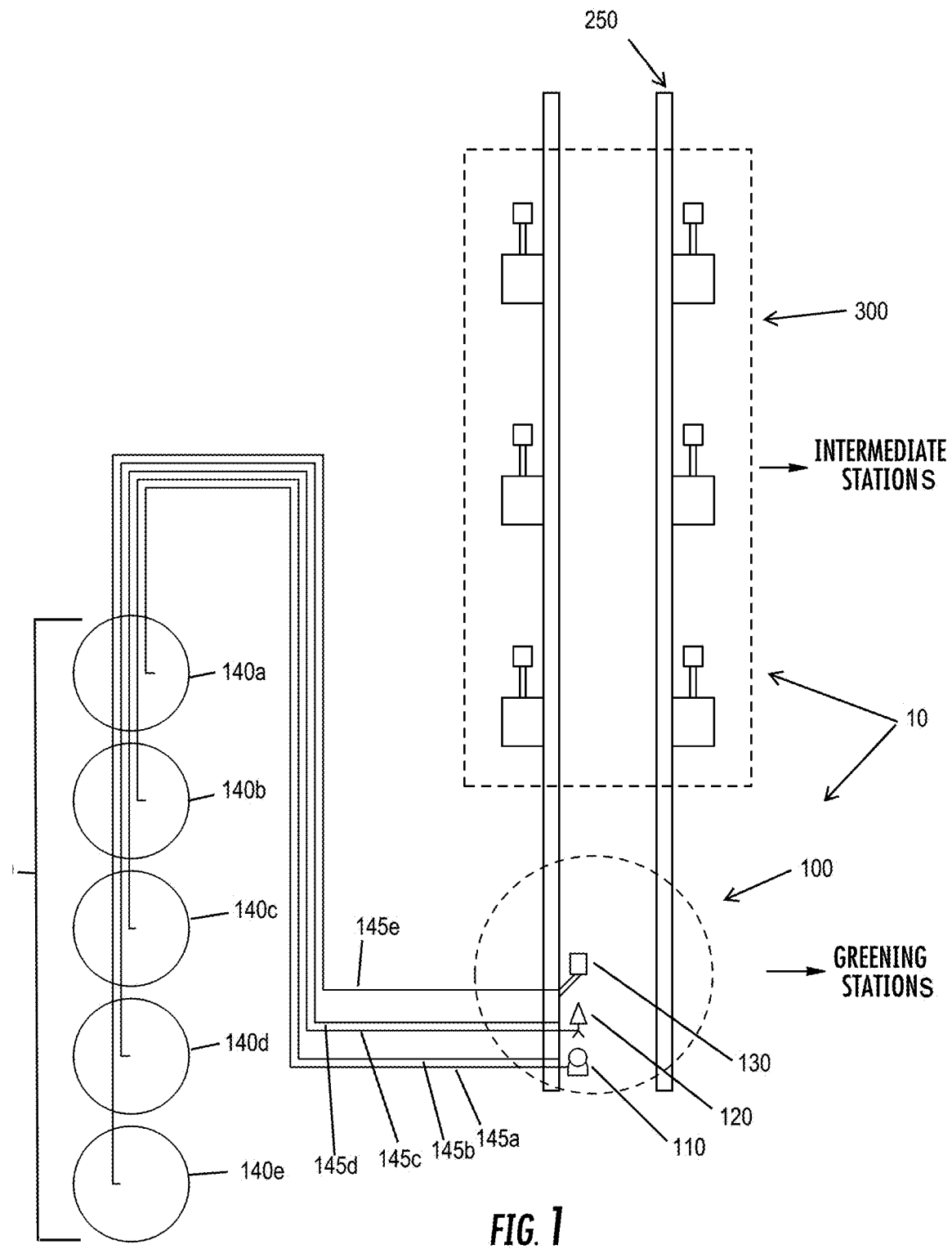
FIG. 1 is a schematic view of one embodiment of a vehicle disassembly line in accordance with disclosed aspects and features.

A novel vehicle disassembly system and method are described herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more. The term "plurality," as used herein, is defined as two or more. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, upper and lower, top and bottom, right and left, and the like may be used solely to distinguish one entity or action from another entity or action without necessarily requiring or implying any actual such relationship or order between such entities or actions.

FIG. 1 illustrates a schematic view of one embodiment of a primary de-pollution and disassembly line 10 suitable for use with the vehicle disassembly system of the present invention. De-pollution and disassembly line 10 may include a de-pollution portion 100, a disassembly portion 300, and a conveyor apparatus 250 extending from the de-pollution portion 100 to the disassembly portion 300.

Referring now to FIGS. 1 and 5-8, the de-pollution portion 100 of the de-pollution and disassembly line 10 functions to efficiently remove would-be contaminants (e.g., fuel, oil, brake fluid, refrigerant, batteries, etc.) from the end-of-life vehicle (ELV) 5. The de-pollution portion 100 preferably is located at a beginning section of de-pollution and disassembly line 10. The de-pollution portion 100 may comprise one or more greening stations. In a preferred embodiment, the de-pollution portion 100 includes at least two greening stations to increase the efficiency of the fluid removal process, with each greening station being spatially separated along a first section of the conveyor apparatus 250. Referring specifically to the embodiment shown in FIG. 1, the de-pollution portion 100 comprises first, second, and third greening stations 110, 120, 130, one or more fluid removal lines 145a-e (e.g., one or more transport piping apparatuses), and one or more storage tanks 140a-e for storing the collected fluids until they can be recycled or otherwise disposed. Each of the greening stations 110, 120, 130 may be specifically adapted for removing a particular type of fluid or other would-be contaminant. For example, the first greening station 110 may be adapted to extract fuel (e.g., gasoline, ethanol, etc.) from the ELV 5 through the use of a fuel removal machine. The second greening station 120 may be adapted to extract oil from the ELV 5 through the use of an oil removal tool machine. The third greening station 130 may be adapted to extract fluids from the ELV's engine compartment such as brake fluid, coolant, refrigerants, etc. through the use of one or more overhead fluid removal machines. As shown in FIG. 1, the greening stations 110, 120, 130 may be spatially separated along a first section of the conveyor apparatus 250. In other embodiments, the functionality of the greening stations 110, 120, 130 as described herein may be combined into a single greening station located along the first section of the conveyor apparatus 250.

The greening stations 110, 120, 130 may be connected to the fluid storage units 140 by one or more fluid removal lines 145 (i.e., lines 145a-e). The fluid removal lines 145 function to transport fluid removed from the ELV to the fluid storage units 140. The fluid removal lines 145 may be a pipe, duct, tube, hose, or any type of vessel capable of transporting fluids from the vehicle 5. The fluid storage units 140 may include one or more storage tanks 140a-e, which may be any type of storage tank capable of storing and holding fluids transported from the ELV 5. In certain embodiments, each greening station may be adapted to collect more than one fluid type from the ELV 5. In such embodiments, more than one fluid removal line 145 may be utilized to connect the greening station to multiple storage tanks. In other embodiments, each greening station may be adapted to collect a single fluid type from the ELV 5, thus requiring only a single fluid removal line 145 to connect the greening station to an assigned storage tank. In further embodiments, certain greening stations will be adapted to collect more than one fluid type, while other greening stations will be adapted to only collect a single fluid type from the ELV 5. Referring to the embodiment depicted in FIG. 1, the de-pollution portion 100 of the de-pollution and disassembly line 10 includes a first fluid removal line 145a connecting the first greening station 110 to a gasoline storage tank 140a, a second fluid removal line 145b connecting the first greening station 110 to a diesel storage tank 140b, a third fluid removal line 145c connecting the second greening station 120 to an oil storage tank 140c, a fourth fluid removal line 145d connecting the second greening station 120 to a hydraulic fluid storage tank 140d, and a fifth fluid removal line 145e connecting third greening station 130 to a coolant storage tank 140e. In further embodiments, additional fluid removal machines dedicated to removing additional fluids (e.g., refrigerant, windshield fluid, etc.) may be utilized at one of the existing greening stations 110,120,130, or an additional greening station can be added to the de-pollution portion 100 to accommodate the additional machinery. In such embodiments, additional fluid removal lines will be utilized to couple the additional fluid removal machines to a storage tank assigned to the particular fluid. In certain embodiments, each fluid removal machine will include an integrated pump to transmit the recovered fluid through the fluid removal lines to each storage tank. In other embodiments, one or more separate pumps may be utilized to transfer the fluid to a corresponding storage tank.

Figure 6:
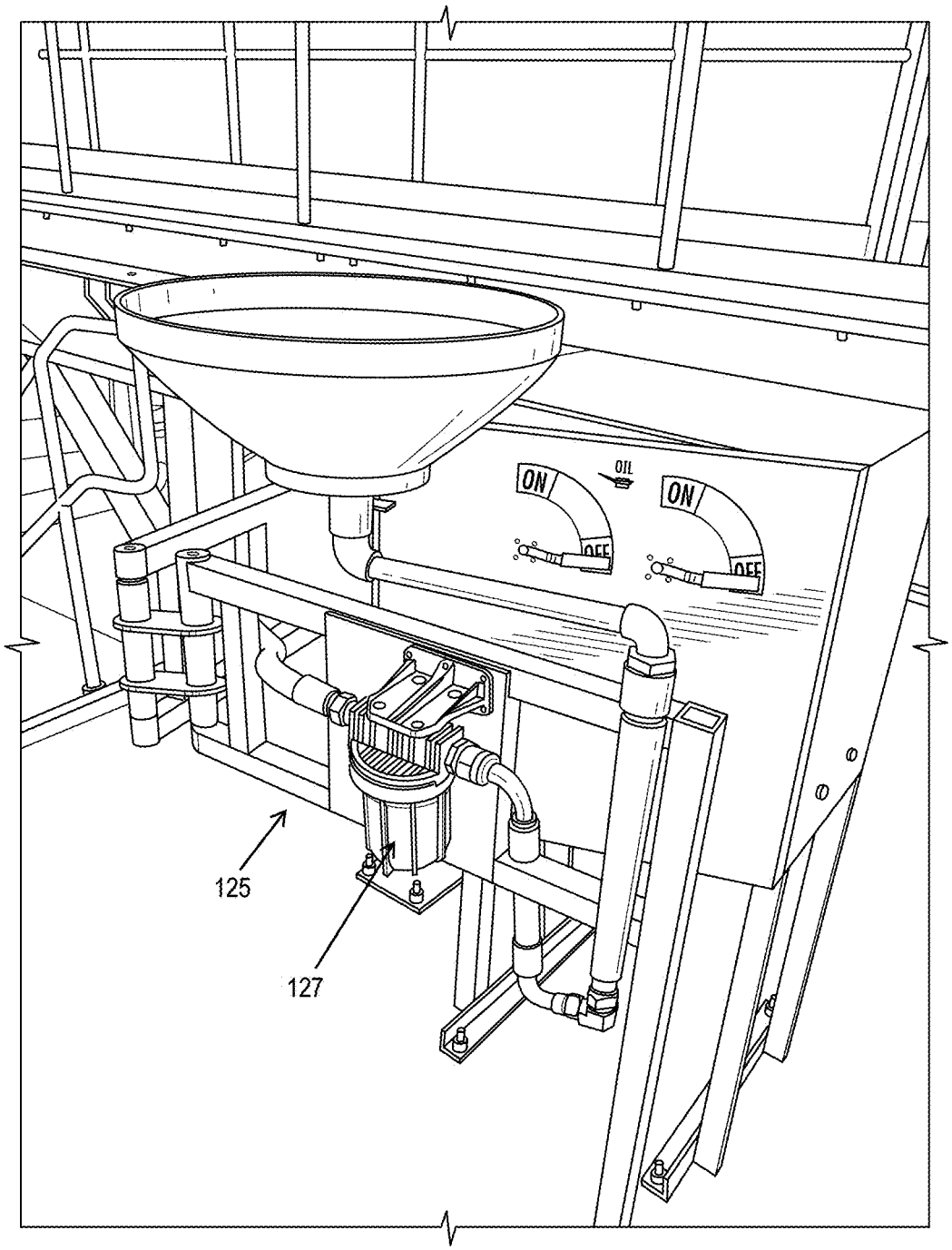
FIG. 6 is a perspective view of one embodiment of a second greening station in accordance with disclosed aspects and features.
Figure 7:
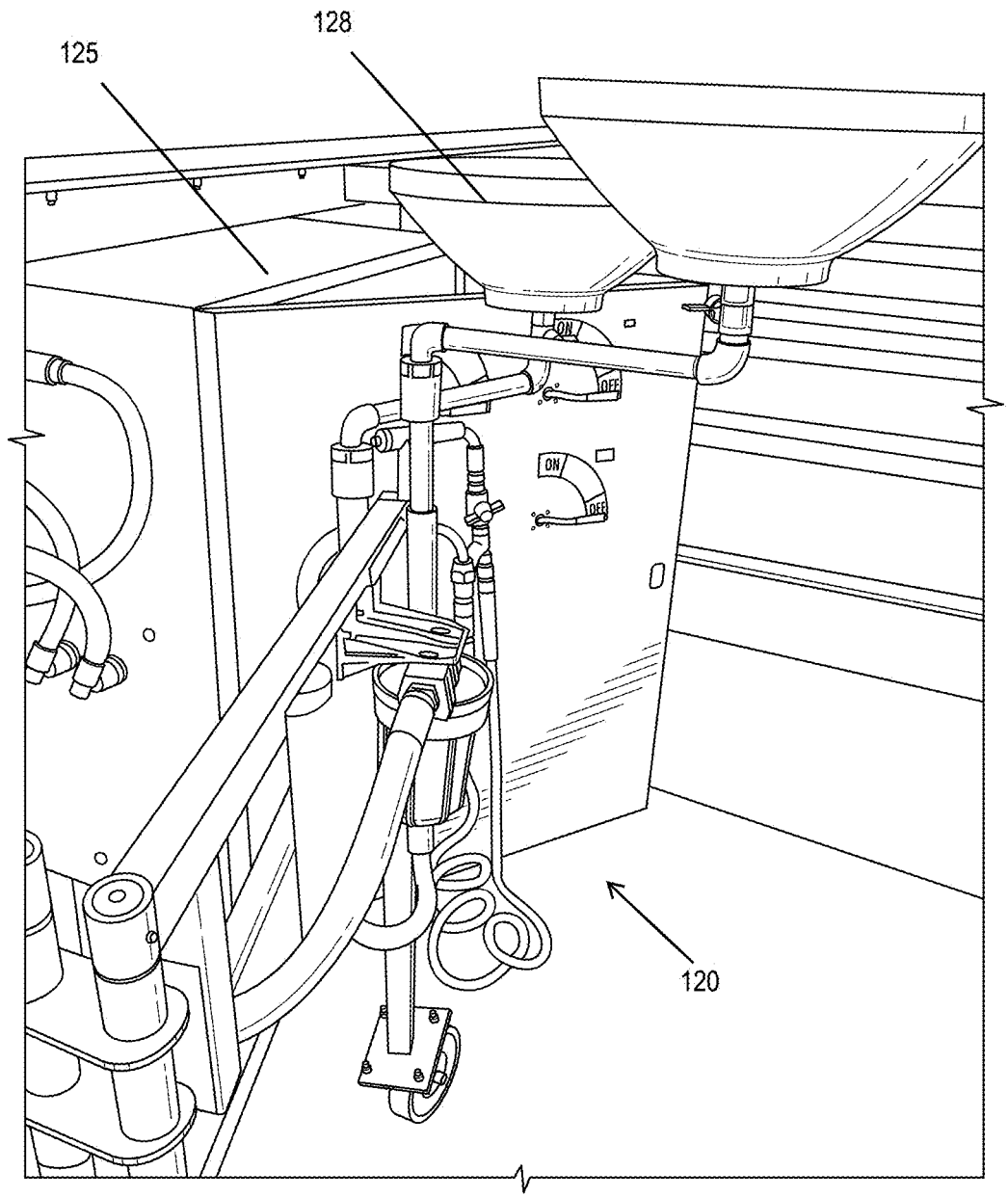
FIG. 7 is a perspective view of an embodiment of the second greening station in accordance with disclosed aspects and features.
Figure 8:
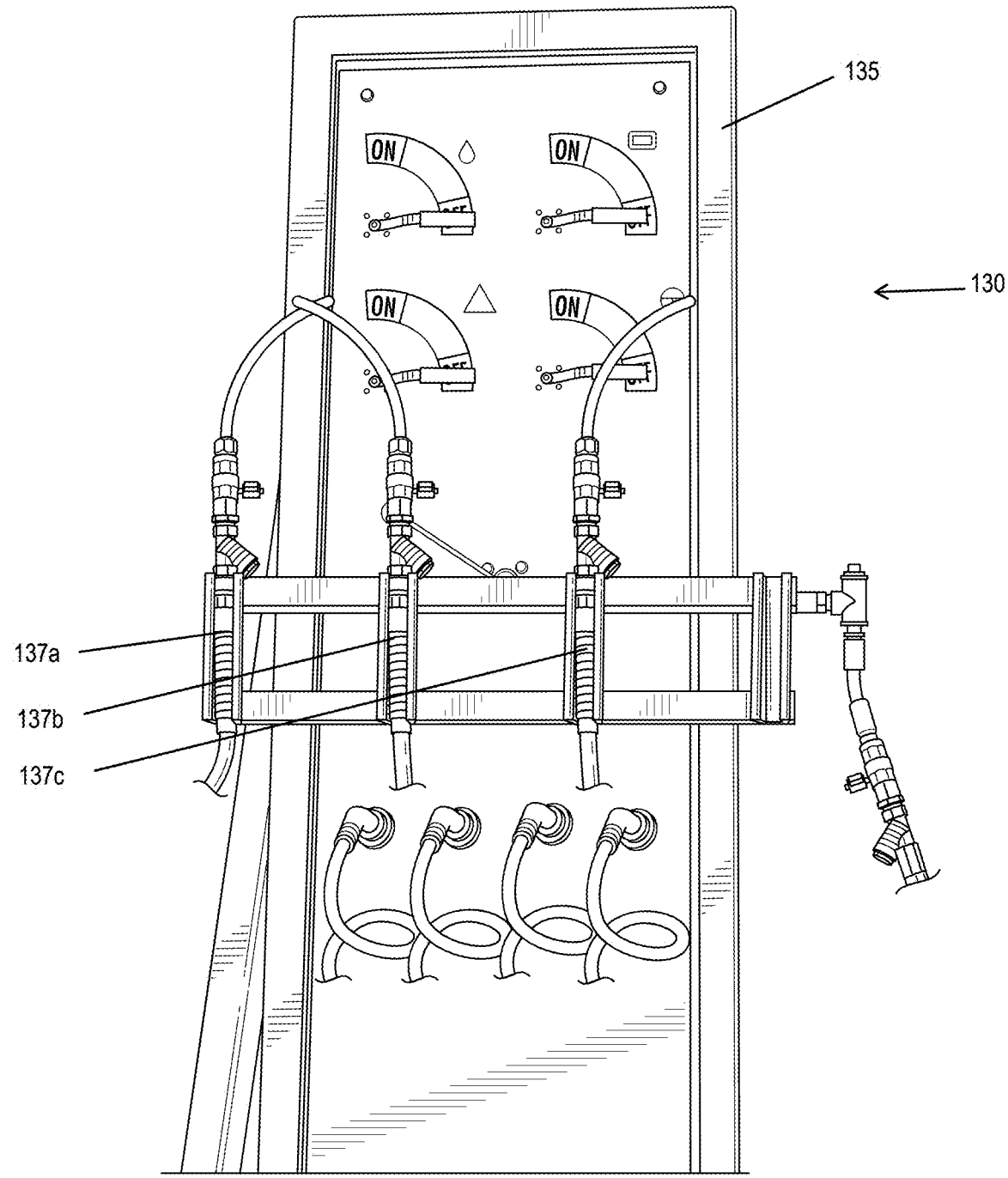
FIG. 8 is a perspective view of one embodiment of a third greening station in accordance with disclosed aspects and features.

Referring to FIGS. 5-8, exemplary embodiments of the first, second, and third greening stations 110, 120, 130 are shown. FIG. 5 illustrates a perspective view of one embodiment of a first greening station 110 adapted to extract fuel (e.g., gasoline, ethanol, etc.) from the ELV 5 through the use of a fuel removal machine 115 (e.g., SEDA™ Drain-Tower™). FIGS. 6 and 7 illustrates a perspective view of one embodiment of a second greening station 120 adapted to extract oil from the ELV 5 through the use of an oil removal tool machine 125 (e.g., SEDA™ EasyDrain™). The oil removal machine 125 of the second greening station 120 may feature a pump 127 for transmitting the recovered oil through the fluid removal line 145c into the corresponding storage tank 140c, and the oil removal machine 125 may include may include one or more funnels 128 that may be used for collecting fluid from the ELV 5. The oil removal machine 125 may also include one or more measurement gauges and knobs, which may be used to operate the oil removal machine 125 (turn OFF/ON, flow control, etc.). FIG. 8 illustrates a perspective view of one embodiment of a third greening station 130 adapted to extract fluids from the ELV's engine compartment such as brake fluid, coolant, refrigerants, etc. through the use of an overhead fluid removal machine 135 having a plurality of suction wands 137a, 137b, 137c.

Referring now to FIGS. 1-4, the conveyor apparatus 250 functions to transport the ELV 5 from the de-pollution portion 100 through the disassembly portion 300 of the disassembly line 10. The dimensions of ELVs can vary widely. To standardize the track width of each ELV (the horizontal distance between the left and right wheels) so that the conveyor apparatus 250 may accommodate a wide variety of ELVs, the vehicle disassembly system of the present invention may further comprise a vehicle cart 200 adapted to carry each ELV down the conveyor apparatus 250.

FIGS. 2A-2D illustrate perspective views of one embodiment of a vehicle cart 200 in accordance with disclosed aspects of the invention. The vehicle cart 200 may be configured such that an ELV 5 may be placed on the vehicle cart 200. The vehicle cart 200 may be configured to move on the conveyor apparatus 250, such as to transport the ELV 5 along the conveyor 250 (e.g., from the de-pollution portion 100 through the disassembly portion 300). The vehicle cart 200 preferably is configured to carry ELVs of varying sizes. The vehicle cart 200 may include a first longitudinal beam 201a, a second longitudinal beam 201b, a front transverse beam 203, a rear transverse beam 205, a first front wheel assembly 210a, a second front wheel assembly 210b, a first rear wheel assembly 220a, a second rear wheel assembly 220b, a first front support block 231a, a second front support block 231b, a first rear support block 233a, a second rear support block 233b, one or more lifting hooks 235, and one or more pulling hooks 236. The first longitudinal beam 201a and the second longitudinal beam 201b may be substantially parallel in orientation and may be spaced apart a predetermined distance. The front transverse beam 203 and the rear transverse beam 205 may be substantially parallel in orientation and may be spaced apart a predetermined distance. The first longitudinal beam 201a and the second longitudinal beam 201b may be connected to the front transverse beam 203 and to the rear transverse beam 205, and each connection may be at a substantially right angle.

Figure 2A:
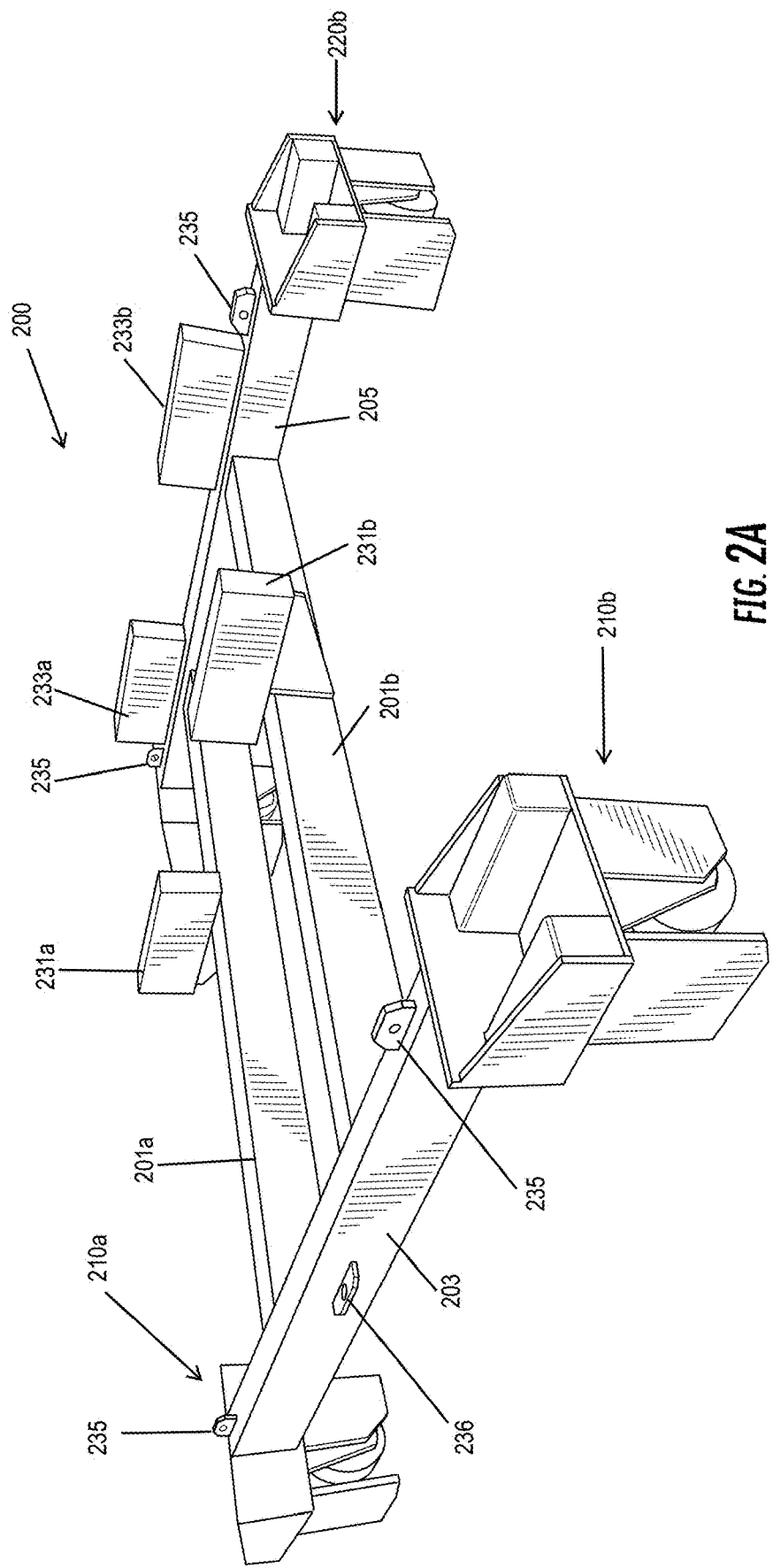
Figure 2C:
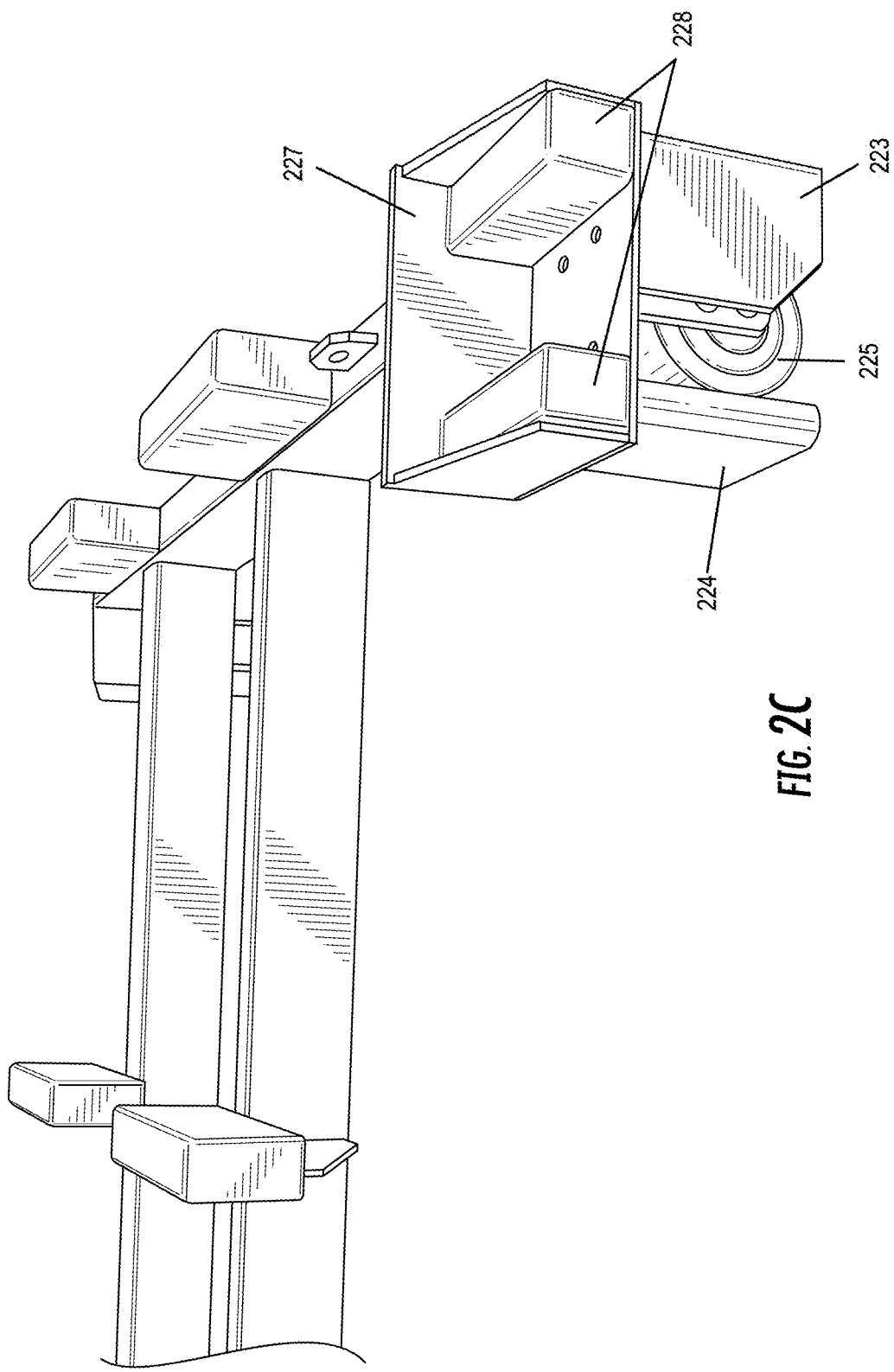

Referring to FIGS. 2A and 2B, the front wheel assemblies 210a, 210b are attached to the front transverse beam 203, while the rear wheel assemblies 220a, 220b are connected to the rear transverse beam 205. The first (e.g., passenger's side) wheel assembly 210a may be connected to a first end of the front transverse beam 203, the second (e.g., driver's side) front wheel assembly 210b may be connected to a second end of the front transverse beam 203, the first (e.g., passenger's side) rear wheel assembly 220a may be connected to a first end of the rear transverse beam 205, and the second (e.g., driver's side) rear wheel assembly 220b may be connected to a second end of the rear transverse beam 205. The longitudinal beam 201 and transverse beams 203, 205 may be supported by the wheel assemblies 210.

As shown in FIG. 2B, the rear wheel assemblies 220 (shown as second rear wheel assembly 220b) may include a rear wall 221, a cutout 222 formed in the rear wall 221, side walls 223, a front wall 224, a wheel 225 (located between the front wall 224, the rear wall 221, and the side walls 223), a stacking box 227, and one or more stacking blocks 228. Front wall 224, rear wall 221, and side walls 223 may provide support for the vehicle cart 200. In some embodiments, stacking box 227 and stacking blocks 228 may support a vehicle 5 by engaging and supporting the tires, wheels, or axles (or some other part) of vehicle 5, such as shown in FIG. 2D. Wheel 225 may provide support for the vehicle cart 200 and may be configured to roll the vehicle cart 200, such as back and forth along the conveyor apparatus 250. In some embodiments, wheel 225 may be a caster wheel, such as to have a swivel mechanism. The stacking box 227 may be formed on a wheel assembly 220.

The first front support block 231a may be connected to, and extend upwardly from, a top side of the first longitudinal beam 201a. The second front support block 231b may be connected to and extend upwardly from a top side of the second longitudinal beam 201b. One or more lifting hooks 235 may be connected to an upper side of the first and second transfer beams 203, 205. One or more pulling hooks 236 may be connected to a lateral side of the first and second transfer beams 203, 205.

Figure 4A:
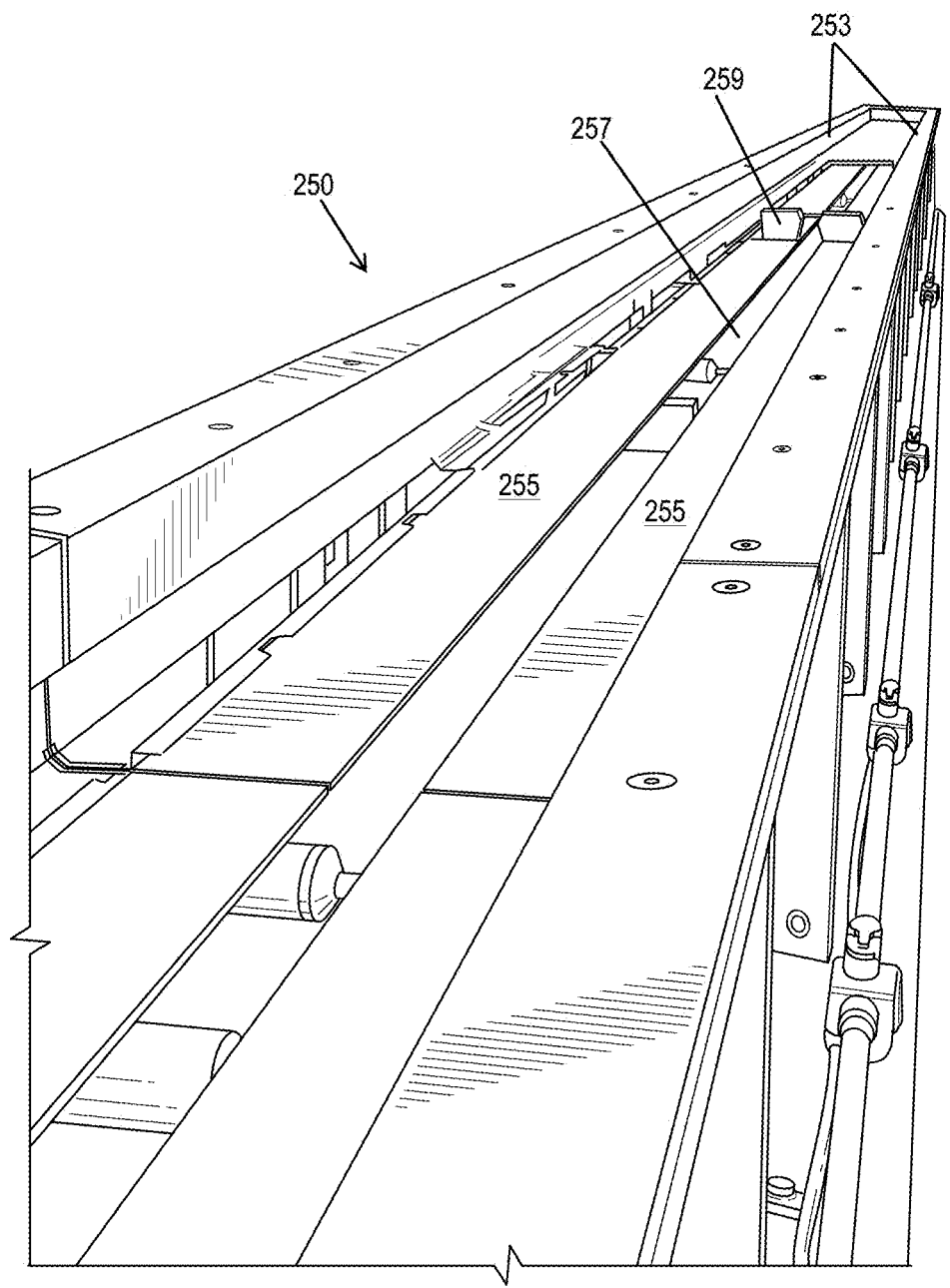
FIGS. 4A-4C are perspective views of an embodiment of the conveyor apparatus in accordance with disclosed aspects and features.
Figure 4B:
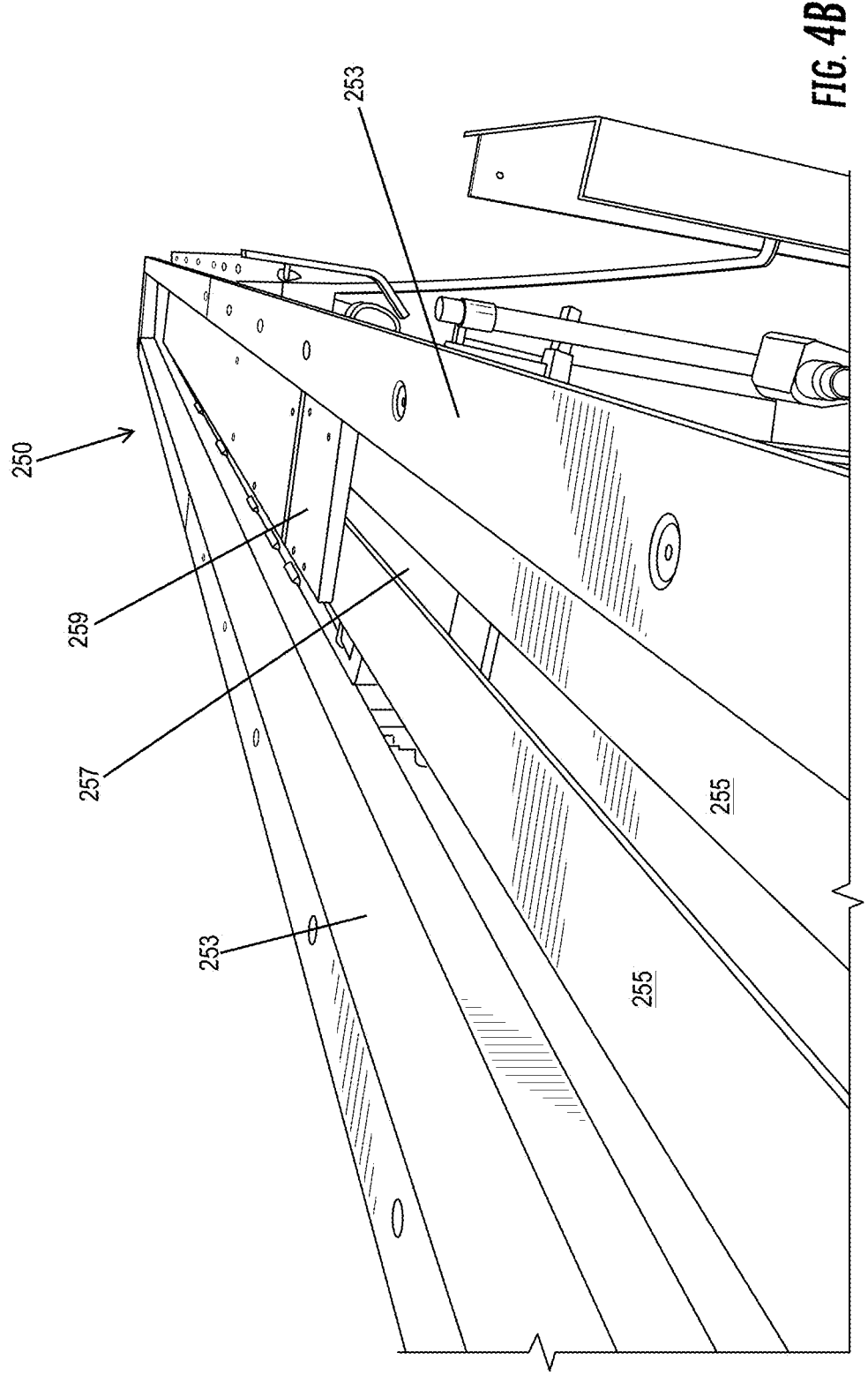
Figure 4C:
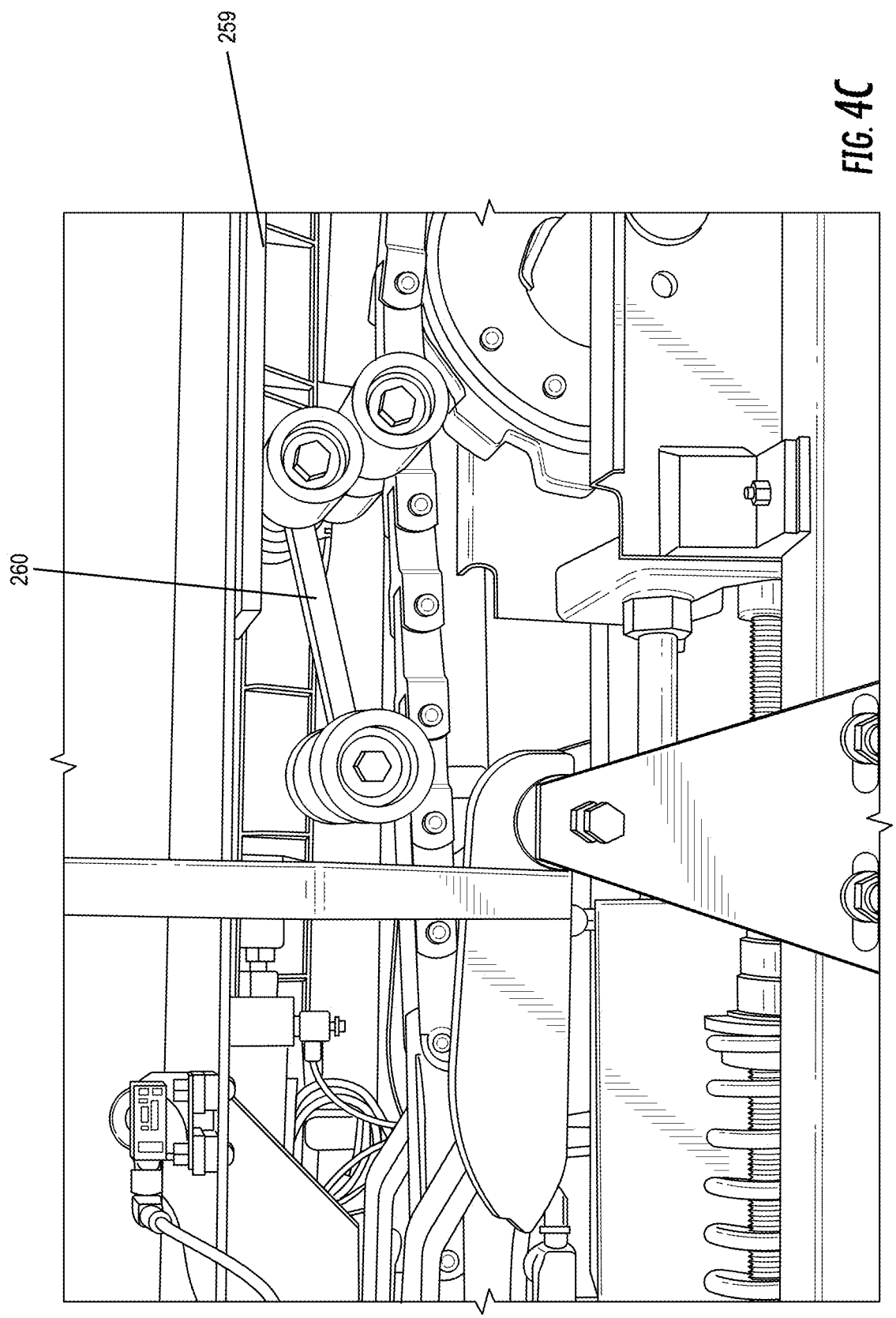

Referring now to FIGS. 1 and 3-4, an embodiment of a conveyor apparatus 250 is illustrated. As shown in FIG. 3, the conveyor apparatus 250 forms an elongated line on which the vehicle cart 200 may be transmitted from the de-pollution portion 100 through the disassembly portion 300 of the de-pollution and disassembly line 10. FIGS. 4A-4C illustrate perspective views of an embodiment of the conveyor apparatus 250. In one example, the conveyor apparatus 250 may be a belt-drive system, a chain-drive system, or other conveyor system known in the art. FIGS. 4A and 4B illustrate top perspective views of an embodiment of the conveyor apparatus 250 and a push-bar trap door 259, and FIG. 4C illustrates a side perspective view of a pusher assembly 260 of the conveyor apparatus 260. The conveyor apparatus 250 may include a conveyor track 255, which may extend along the length of the conveyor apparatus 250. The conveyor track 255 may also include guide walls 253, a conveyor floor 255, a pusher slot 257, a pusher trap door 259, and a pusher assembly 260. In some embodiments, the conveyor track 255 may include a floor portion that may include a pusher slot 257 formed therein and guide walls 253 positioned on each side of the conveyor track 255.

The trap door 259 may be formed in the conveyor floor portion. The pusher assembly 260 may include one or more rollers adapted to engage the rear wall 221 of either the left or right rear wheel assemblies 220 at a position proximate to the cutout 222 formed in the rear wall 221. In operation, the pusher assembly 260 will exit the trap door 259 and extend through the pusher slot 257 to engage the rear wall 221 of either the left or right rear wheel assemblies 220. The pusher assembly 260 will then function to push the vehicle cart down the conveyor track 255 at a preset speed. In one embodiment, a chain or belt attached to a lower portion of the conveyor track 255 will engage the pusher assembly 260 to drive both the pusher assembly 260 and the vehicle cart 200 down the conveyor track 255 in a first direction. In alternative embodiments, the conveyor apparatus 250 may utilize a front-wheel-pull design as opposed to the rear-wheel-push design described herein.

As shown in FIGS. 1 and 3, both the greening stations 110, 120, 130 and the intermediate part removal stations 301 may be located along the length of the conveyor apparatus 250. In some embodiments, one or more of the machines associated with the first and second greening stations 110, 120 may be located at least partially below the conveyor track 255 to allow for easier access to the fluid repositories located on the ELV 5, while one or more of the machines associated with the third greening station 130 are positioned at least partially above the conveyor track 255. In some embodiments, greening stations 110, 120, 130 and part removal station portion 300 may be located in other locations in relation to the conveyor apparatus 250. In further embodiments, other items, tools, devices, and the like may be positioned along and/or connected to the conveyor apparatus 250.

Figure 9:
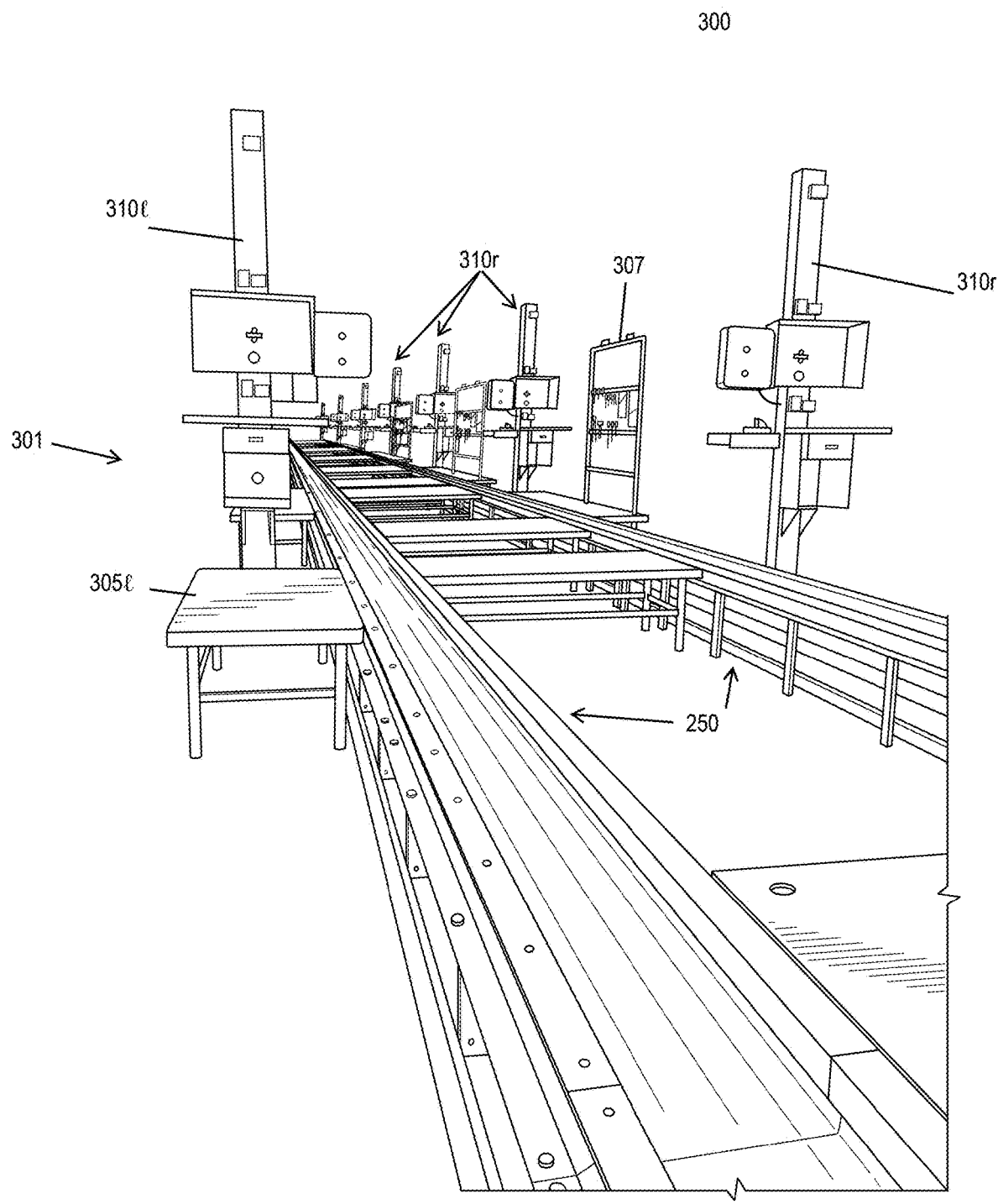
FIG. 9 is a perspective view of the conveyor apparatus, the conveyor track, and the part removal station portion in accordance with disclosed aspects and features.

Referring now to FIGS. 9-11, an embodiment of the the disassembly portion 300 of the de-pollution and disassembly line 10 is depicted. The disassembly portion 300 may include a plurality of intermediate part removal stations 301 positioned spatially apart along the length of the conveyor apparatus 250. Each intermediate part removal station 301 may include devices or tools configured to remove parts of the ELV 5. Each intermediate part removal station 301 may be assigned to remove specific types of parts from the ELV 5 being transmitted down the conveyor apparatus 250. For example, the first intermediate part removal station 301 may be assigned to remove body parts of the ELV, such as bumpers, side mirrors, hoods, etc; the second intermediate part removal station 301 may be assigned to remove wheels and tires; the third intermediate part removal station 301 may be assigned to remove interior parts; and the fourth intermediate part removal station 301 may be assigned to remove parts located on the ELVs undercarriage, such as the drive shaft and brake components. Alternatively, each intermediate part removal station 301 may be assigned to remove particular part(s) from the ELV 5 by software designed to optimize the part removal process. For example, upon entering a vehicle's VIN number into the program, the software may identify the specific vehicle parts in demand from the particular vehicle and assign the removal task to one, or several, of the intermediate part removal stations 301 in order to maximize economic return and/or the line rate (i.e., the rate at which the ELVs are transmitted down the conveyor apparatus 250).

Still referring to FIGS. 9-11, each intermediate part removal station 301 may include left and right work platforms 305 positioned adjacent to left and right terminals 310*l*, 310*r*, respectively. In preferred embodiments, each intermediate part removal station 301 will comprise a left and right terminals 310ℓ, 310r positioned substantially across from one another. In such arrangements, the left part removal terminal 310ℓ will be positioned on the left side (i.e., the driver's side of the mounted ELV) of the conveyor apparatus, while a right part removal terminal 310r will be positioned on the right side (i.e., the passenger's side of the mounted ELV) of the conveyor apparatus at a position substantially across from the left part removal terminal 310€. In certain embodiments, the disassembly portion 300 may further comprise a tool wall 307 positioned along the length of the conveyor apparatus 250 between each intermediate part removal station 301. The disassembly portion 300 preferably includes a plurality of intermediate part removal stations 301, with each having left and right terminals 310ℓ, 310r. The plurality of intermediate part removal stations 301 are preferably spaced apart along the length of the conveyor apparatus 250 by a distance of 20-30 feet, and more preferably 26-28 feet. In the embodiment depicted in FIG. 9, a total of six (6) intermediate part removal stations 301 are shown. In alternative embodiments, additional intermediate part removal stations 301—or fewer intermediate part removal stations 301—may be utilized.

Referring to FIG. 9, left and right terminals 310ℓ, 310r may include devices and/or tools used to remove parts from the vehicle 5. The right terminal 310r may include a work platform 305r configured for use by a worker. The terminal 310r may include a computing device (CPU, computer, and the like), monitor, or other equipment configured for use in the removal of parts from the vehicle 5. The left terminal 310ℓ may be similarly configured so that each side of the ELV may be worked on simultaneously. The tool wall(s) 307 may include one or more tools (mechanical tools, electrical tools, etc.) configured for use (e.g., by a user) in the removal of parts from the vehicle 5. In operation, one or more workers will be stationed at the left terminal 310€, and one or more workers will be stationed at the right terminal 310r. At each terminal, the worker(s) may stand or sit on a work platform 305 and may operate tools, computing devices, or other devices to remove parts from the ELV. In some embodiments, a tool 304 may be attached (e.g., mounted to, connected to, hanging, etc.) to a guidewire 303, such that the tool 304 may move on the guidewire 303 between a plurality of stations.

Figure 11A:
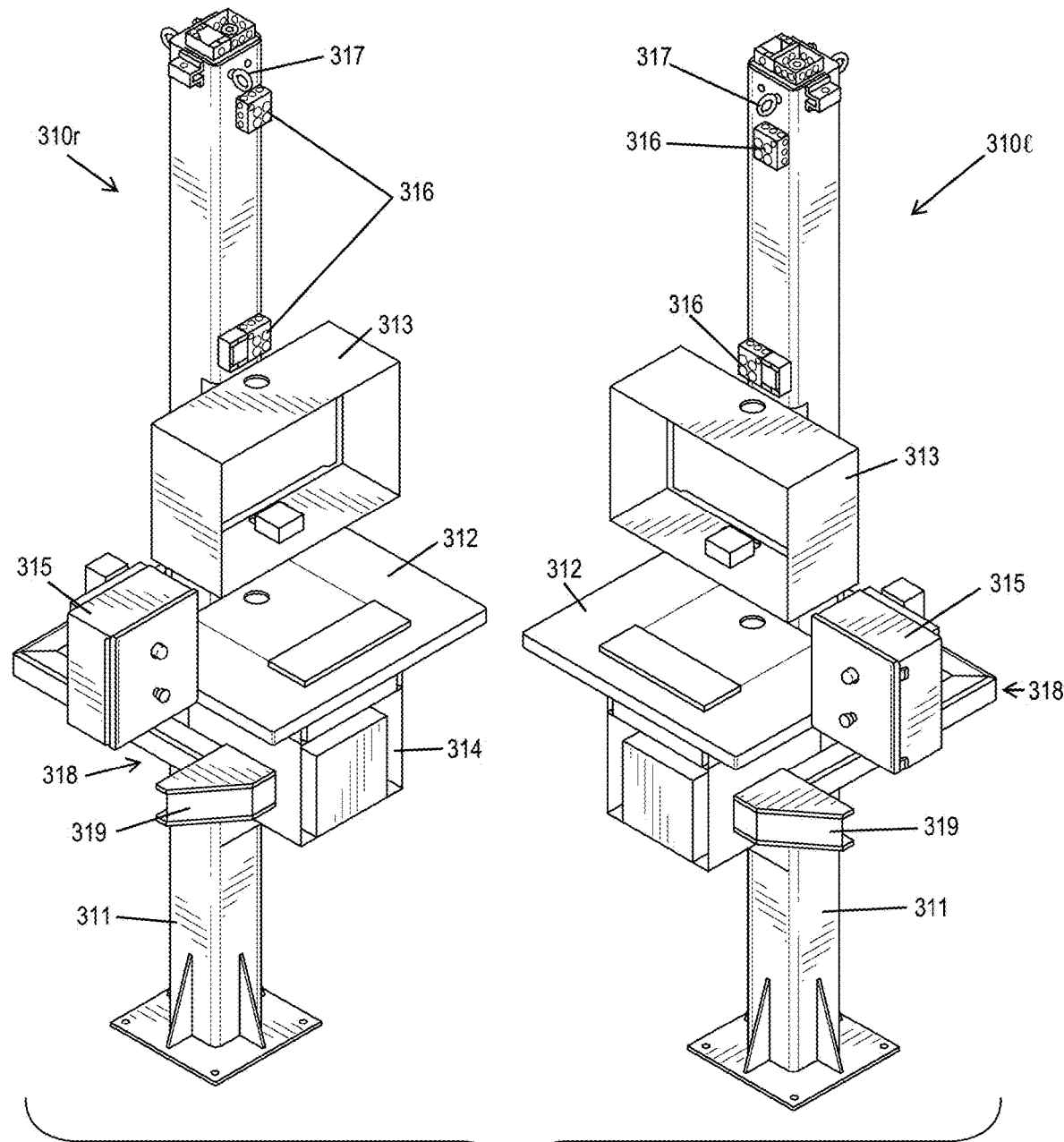
FIGS. 11A and 11B are perspective views of an embodiment of a part removal station having two command terminals in accordance with disclosed aspects and features.
Figure 11B:
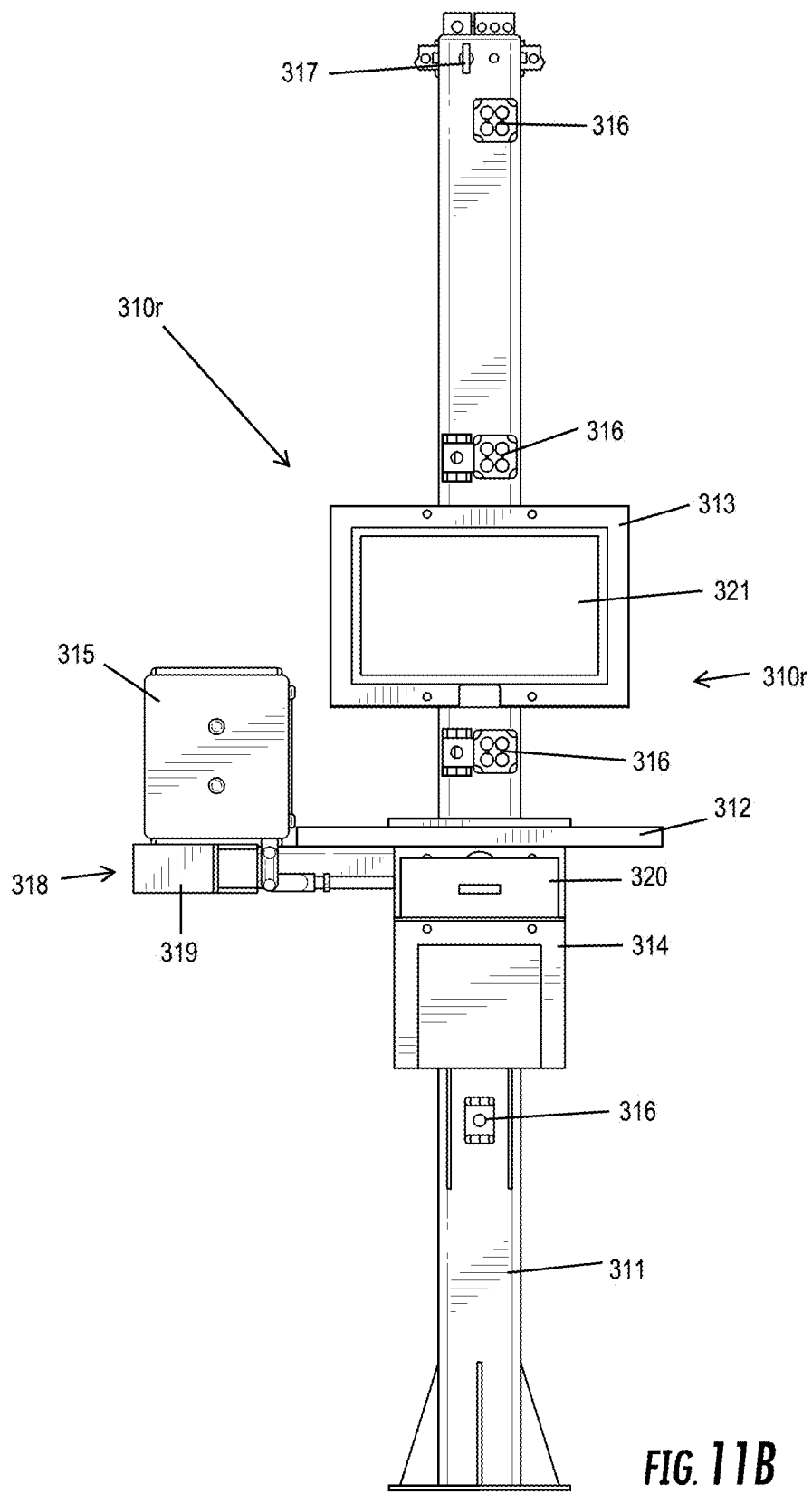
Figure 12:
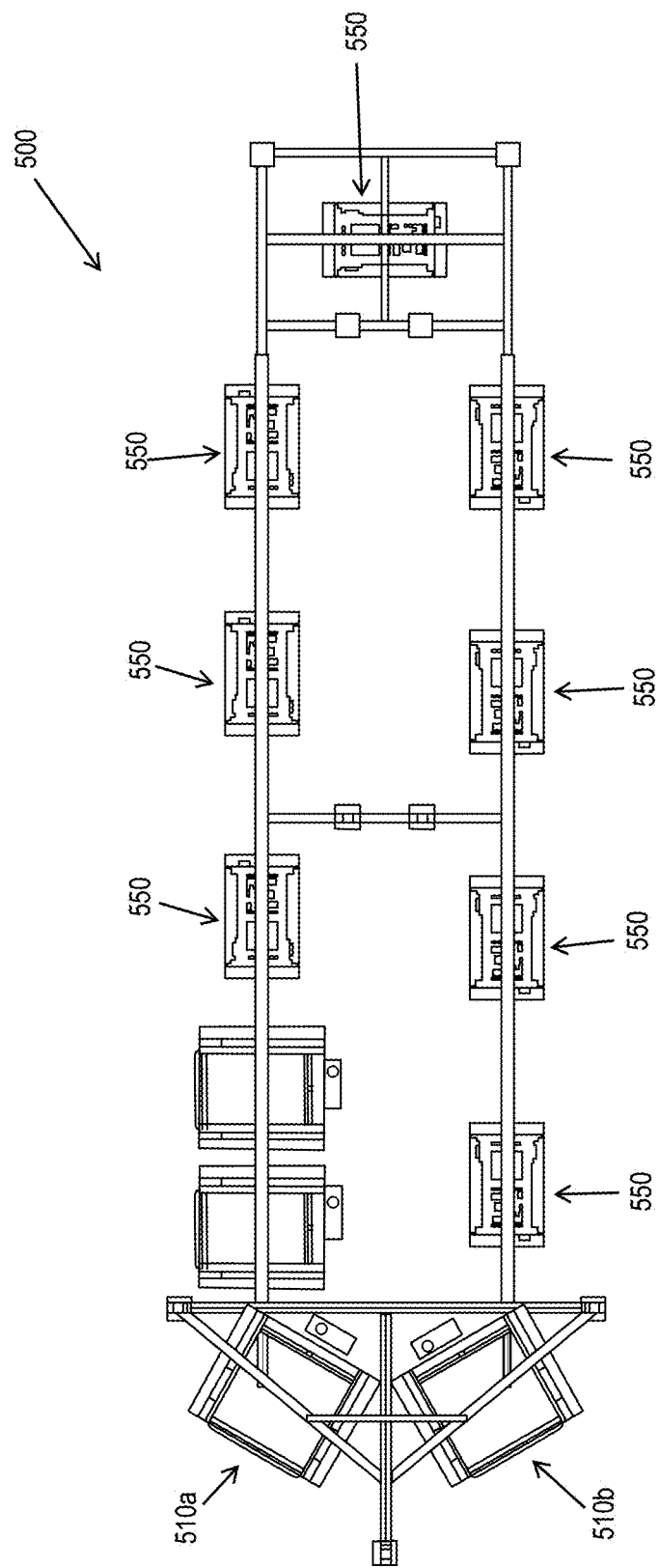
FIG. 12 is an embodiment of an engine disassembly line in accordance with disclosed aspects and features.

Referring now to FIGS. 11A and 11B, an embodiment of the left and right terminals 310€, 310r of an intermediate part removal station 301 is depicted. The left and right terminals 310€, 310r each may include an upright post 311, a work table or surface 312, a monitor enclosure 313, a printer enclosure 314, a relay box 315, one or more power ports 316, a wire mount 317, a bumper arm 318, a bumper 319, a tool drawer 320, and a monitor 321. The work surface 312 may attach to the post 311. The bumper arm 318 and the attached bumper 319 extend from the post 311 laterally towards the conveyor apparatus 250 and function to any doors left open on the ELV 5 from contacting the other components of the left and right terminals 3100, 310r, particularly the computing hardware housed within the left and right terminals 3100, 310r. The monitor enclosure 313 may enclose five sides of the monitor 321, leaving uncovered the screen.

The vehicle disassembly system of the present invention may further comprise an engine disassembly line 500. Referring to FIGS. 12-21, an exemplary embodiment of an engine disassembly line 500 is depicted. Engine disassembly line 500 may include one or more engine loading stations 510a, 510b, one or more engine disbanding stations 550, and one or more engine unloading stations 570a, 570b. The engine disassembly line 500 is preferably located adjacent to the disassembly portion 300 of the disassembly line 10 to allow an engine removed from ELV 5 to be easily transported from the end of the conveyor apparatus 250 to the engine disassembly line 500. In a preferred embodiment of a vehicle recycling plant housing the vehicle disassembly system of the present invention, the one or more engine loading stations 510a, 510b of the engine disassembly line 500 are located proximate to (i.e., within 100 feet) of the end of disassembly portion 300 of the primary de-pollution and disassembly line 10.

Figure 13:
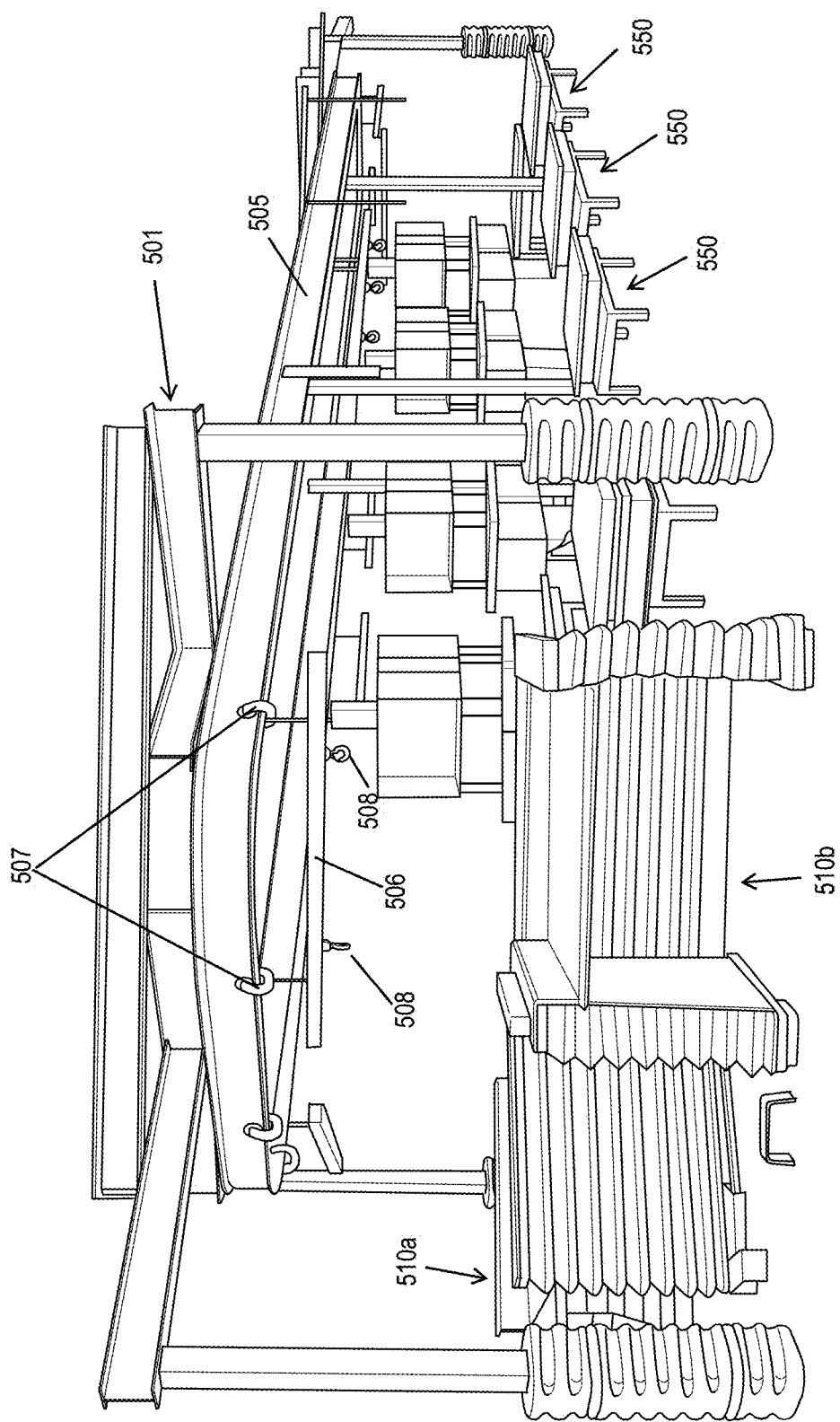
FIG. 13 is a front perspective view of an embodiment of an engine disassembly line as shown in FIG. 12 in accordance with disclosed aspects and features.

As shown in FIG. 13, the engine disassembly line 500 may include an overhead track support frame 501, a track 505, a support beam 506, a trolley assembly 507, support hooks 508 attached to a support beam 506, a first engine loading station 510a, a second engine loading station 510b, and attachment hooks 512. The overhead track support frame 501 may be attached to and support the track 505, which may end along the support frame 501. In some embodiments, the support frame 501 may a height-adjustable support frame 501. The trolley assembly 507 may include the one or more attachment hooks 512. In some embodiments, the trolley assembly 507 may be a U-shaped trolley and may be suspended from and configured to move along the track 5. For example, the track 5 may be an I-beam, and the U-shaped trolley body may engage flanges on the I-beam to move about the track 5. The support beam 506 may be suspended from the trolley assembly 507 by one or more hooks 512. As shown in FIG. 13, a plurality of engine disbanding stations 550 may be positioned along the track 505. A vehicle engine can be loaded at one of the engine loading stations 510, and may be attached to the hooks 508 (e.g., via a string, chain, wire, etc.). The vehicle engine may traverse the track 505 and may move from one engine disbanding station 550 to another engine disbanding station 550. Each engine disbanding station 550 may be configured with tools or devices that may be used to disassemble or disband one or more parts from the vehicle engine.

Figure 14:
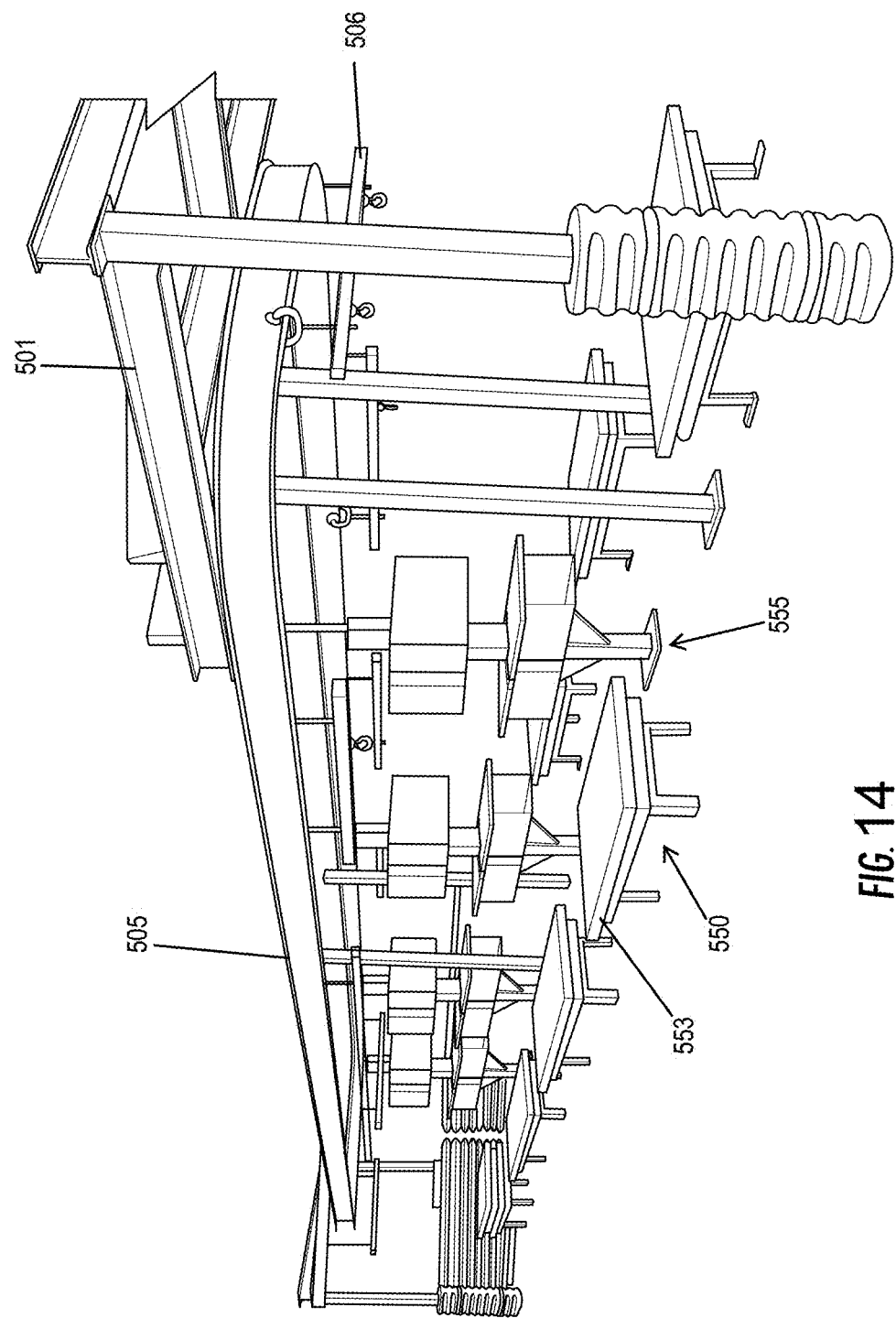
FIG. 14 is a rear perspective view of an embodiment of an engine disassembly line as shown in FIG. 12 in accordance with disclosed aspects and features.

As shown in FIG. 14, the engine disassembly line 500 may include one or more engine disassembly stations 555, which may be located at centralized locations under the track 505. In one example, a vehicle engine may be disassembled at an engine disassembly station 555, such as by having a user remove one or more parts from the vehicle using a tool or hands. As shown in FIG. 14, an engine disbanding station 550 may include a height adjustable work table 553. The work table 553 may include a pneumatic lift mechanism or system that may be used to adjust the height of the table 553, such as to lift people or items placed on to the table 553. In one example, a user may stand or sit on the table 553, which may raise the user close to an engine vehicle being suspended by a support beam 506.

Figure 15:
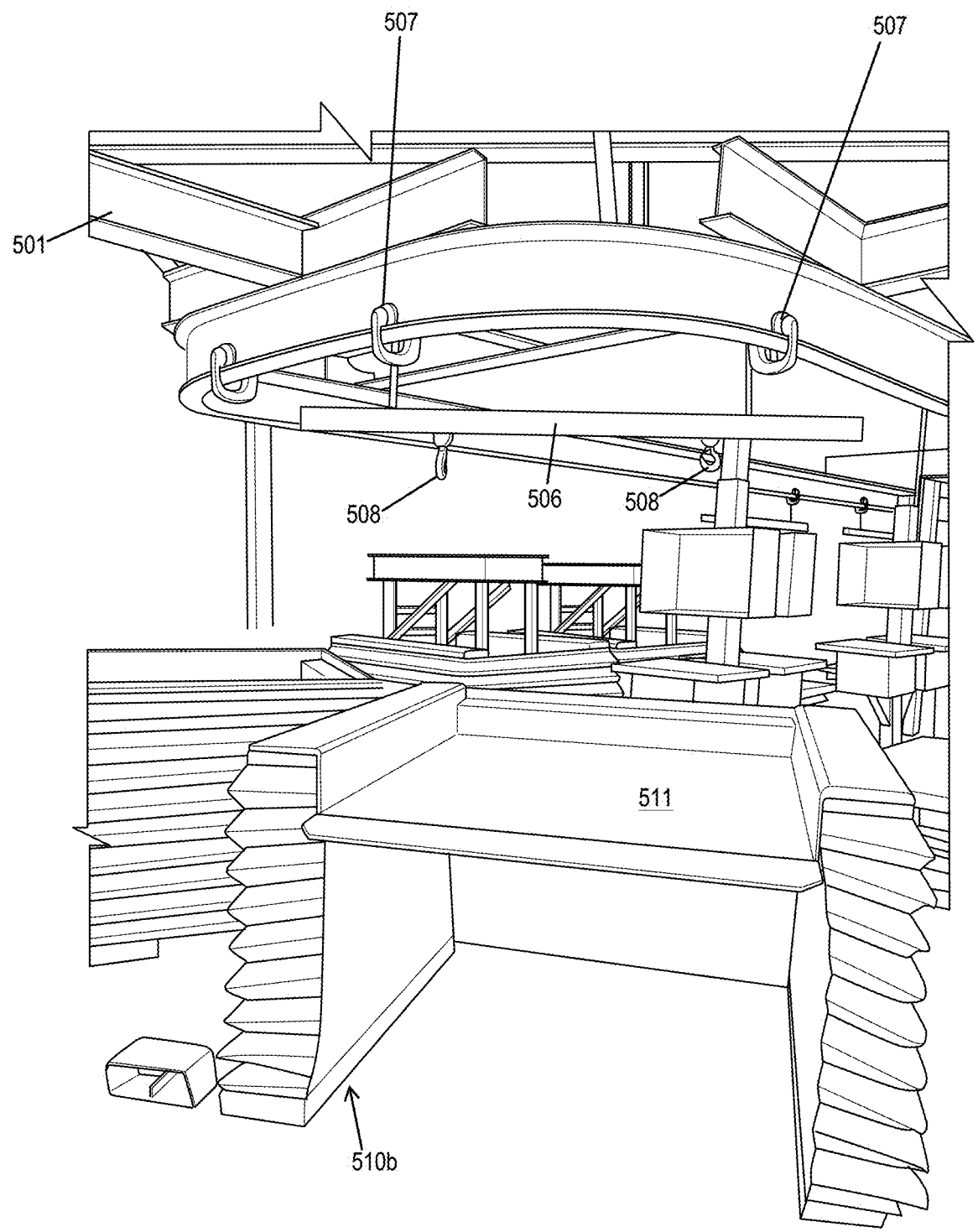
FIG. 15 is a front perspective view of an embodiment of an engine disassembly line as shown in FIG. 12 in accordance with disclosed aspects and features.
Figure 16:
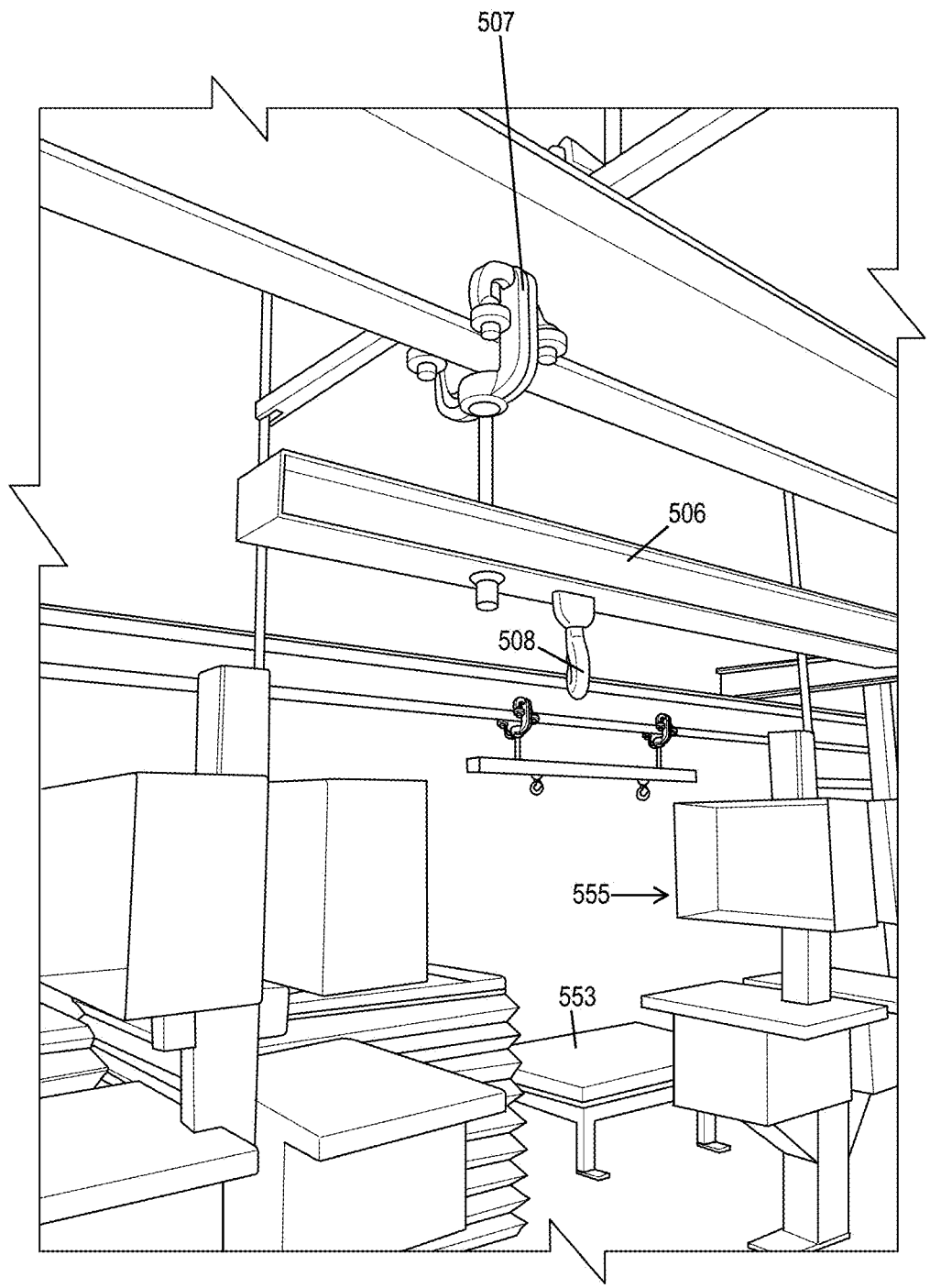
FIG. 16 is a front perspective view of an embodiment of an engine disassembly line as shown in FIG. 12 in accordance with disclosed aspects and features.
Figure 17:
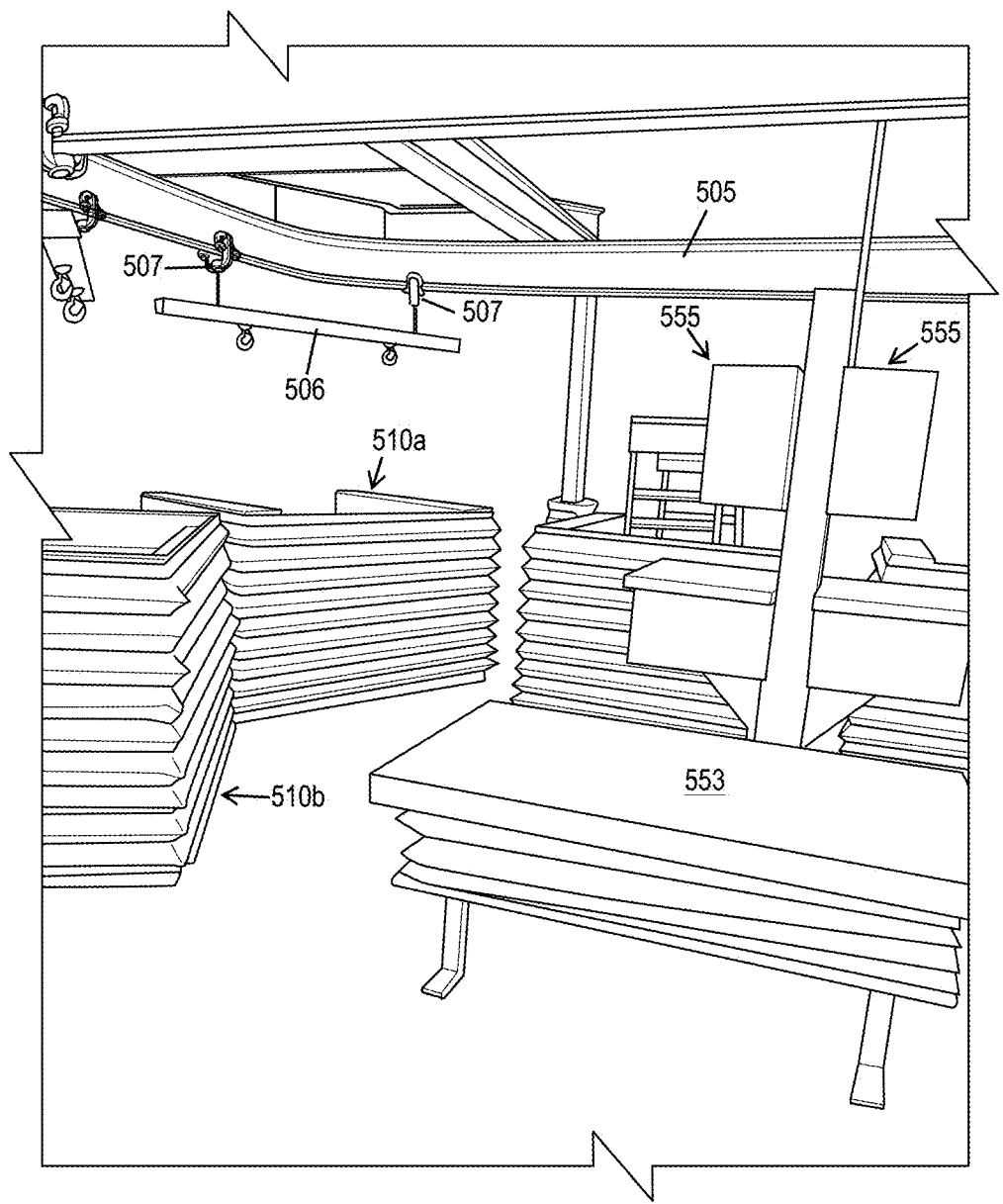
FIG. 17 is a perspective view of an embodiment of an engine disassembly line as shown in FIG. 12 in accordance with disclosed aspects and features.
Figure 18:
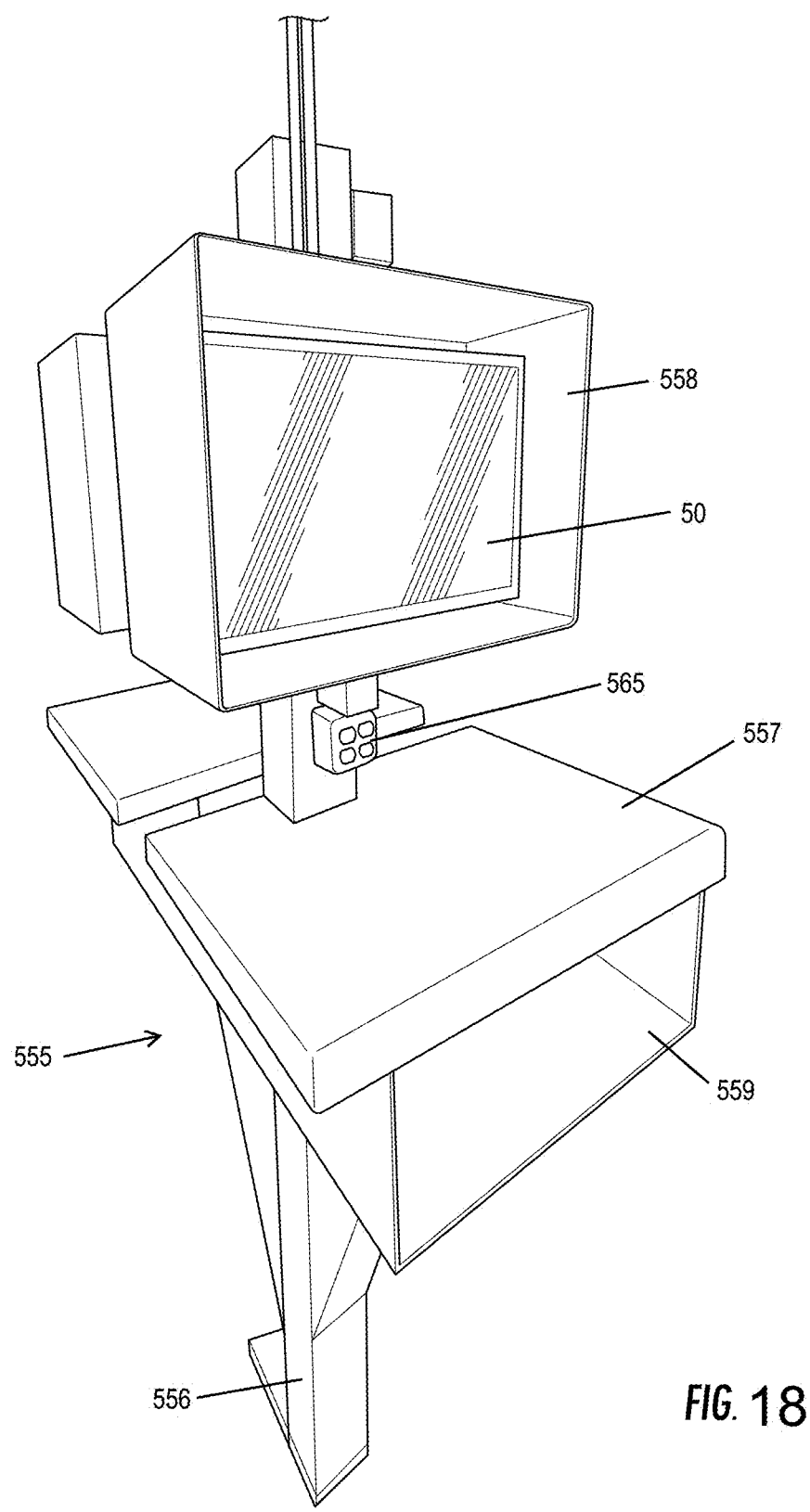
FIG. 18 is a perspective view of an embodiment of an engine disassembly line showing an engine disassembly station in accordance with disclosed aspects and features.

As shown in FIG. 15, the engine loading station 510b may include a height adjustable loading table 511, which may include a pneumatic lift mechanism or system that may be used to adjust the height of the table 511, such as to lift items (e.g., a vehicle engine) placed on to the table 511 onto the hooks 508. As shown in FIG. 16, the trolley assembly 507 may be U-shaped. Also shown in FIG. 16, an engine disassembly station 555 may be located in a centralized location below the track 505. The engine disassembly station 555 may include a post 556, a work table 557, a monitor enclosure 558, a printer enclosure 559, a power port 565, and a monitor 50. The work table 557 may be a non-adjustable table and may be mounted on the post 556 positioned along the engine disassembly line 500. The monitor enclosure 558, printer enclosure 559, and power port 565 may be mounted on the post 556. The monitor 50 may be connected to a computing device.

Figure 19:
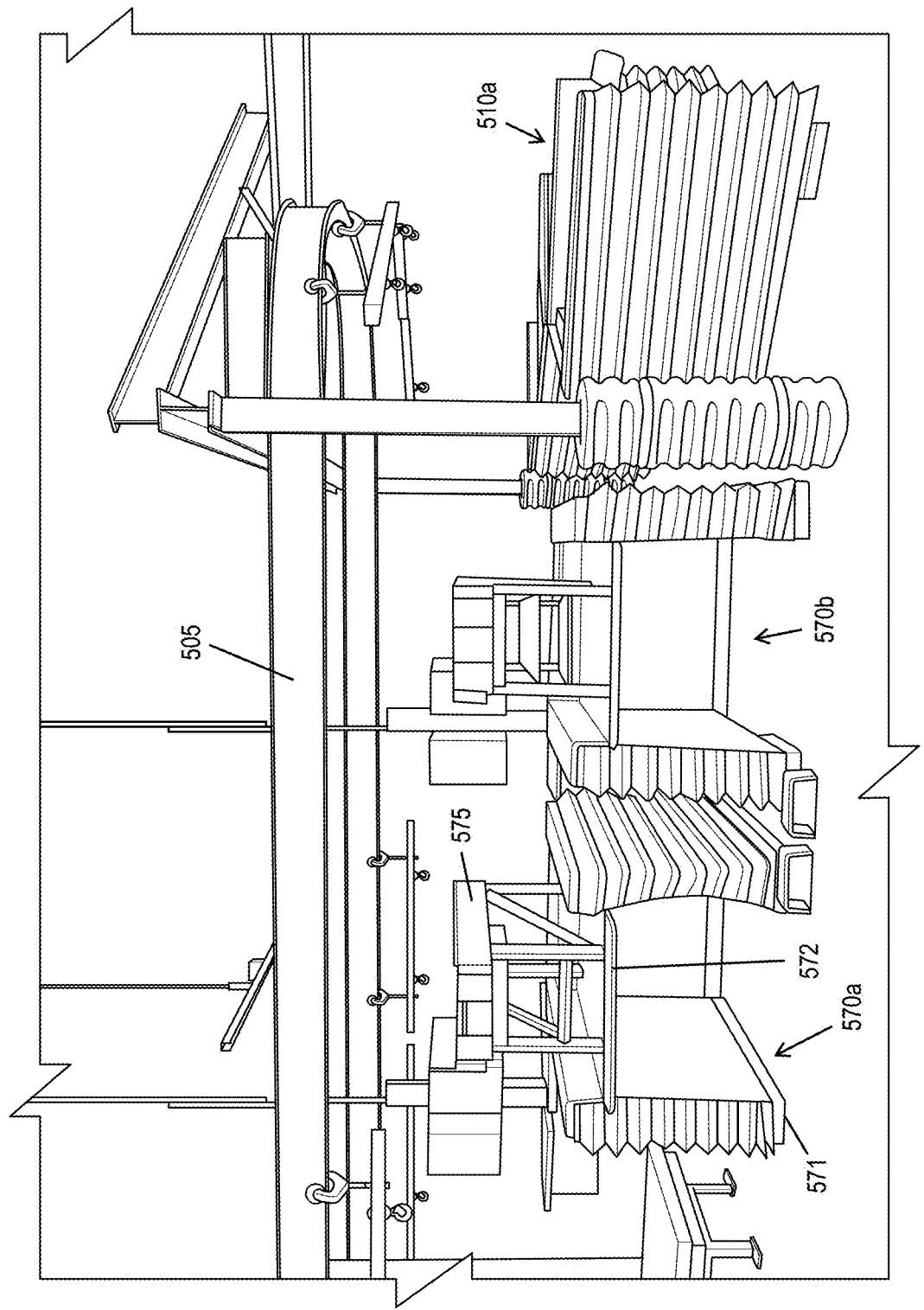
FIG. 19 is a perspective view of an embodiment of an engine disassembly line showing engine unloading stations in accordance with disclosed aspects and features.

FIG. 19 illustrates a perspective view of an embodiment of the engine disassembly line 500 showing engine unloading stations 570a, 570b. As shown in FIG. 19, an engine unloading station 570a may include a height adjustable table 571, a table surface 572 that may be adjustable in height, and an engine unloading roller assembly 575. The height adjustable unloading table 571 may support the engine unloading roller assembly 575 and may be positioned along the track 505 adjacent to a loading table 510a. The table 571 may be configured to hold an item (e.g., a vehicle engine), such as on the engine unloading roller assembly 575, and may lower and/or raise the item in relation to the track 505. For example, a vehicle engine may be unloaded from the support beam 506 and onto a raised unloading roller assembly 575, and the table 571 may lower the unloading roller assembly 575 by lowering the table surface 572.

Figure 20:
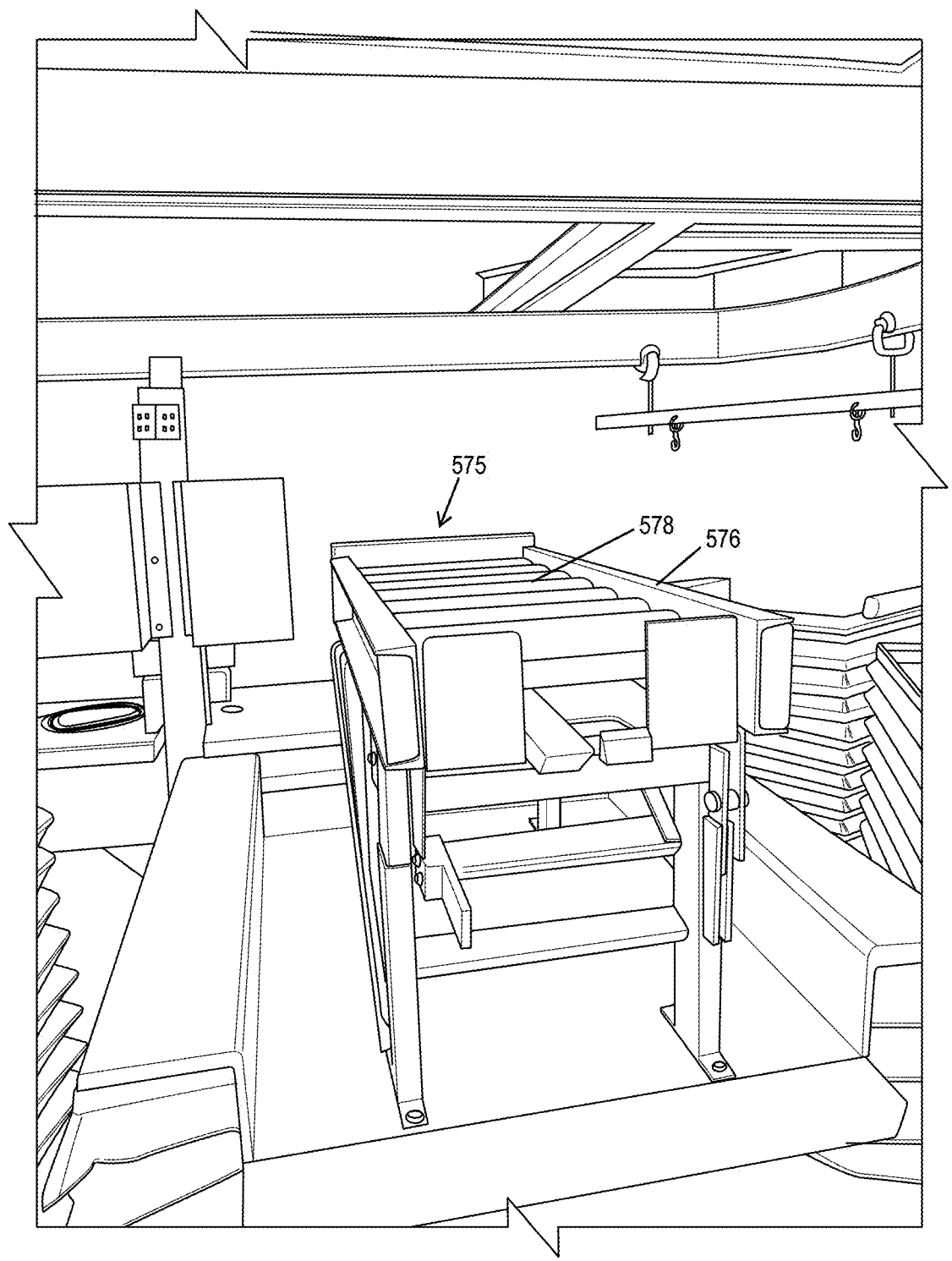
FIG. 20 is a perspective view of an embodiment of an engine disassembly line showing an engine unloading roller assembly in accordance with disclosed aspects and features.

FIG. 20 illustrates a perspective view an embodiment of the engine disassembly line 500 showing an engine unloading roller assembly 575. The engine unloading roller assembly 575 may include a frame 576 and rollers 578, which may be positioned in and attached to the frame 576. The rollers 578 may be configured to transport items across the rollers 578 by facilitating the rolling of items placed on the roller assembly 575.

Figure 21:
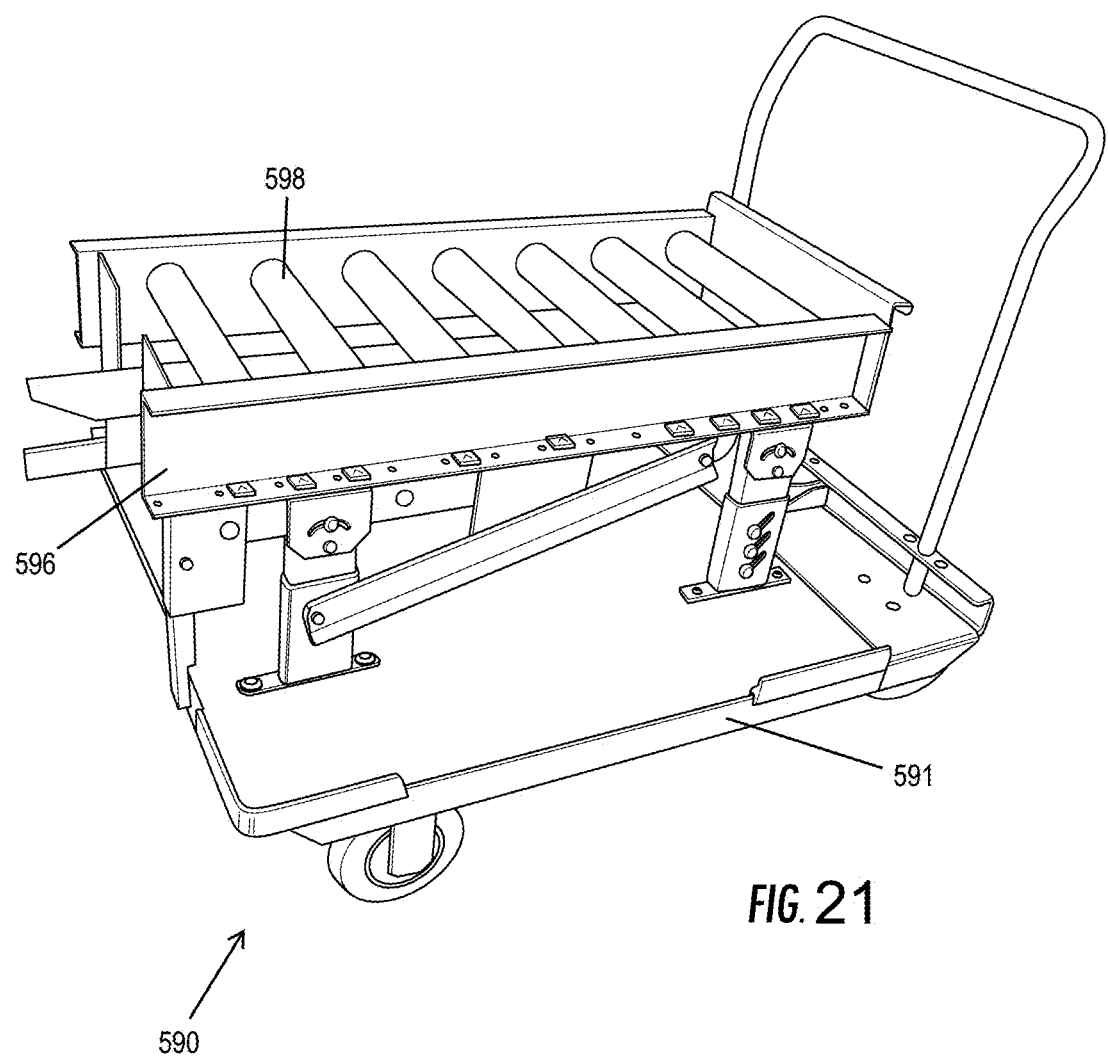
FIG. 21 is a perspective view of an embodiment of an engine disassembly line showing an engine unloading roller cart in accordance with disclosed aspects and features.
Figure 22:
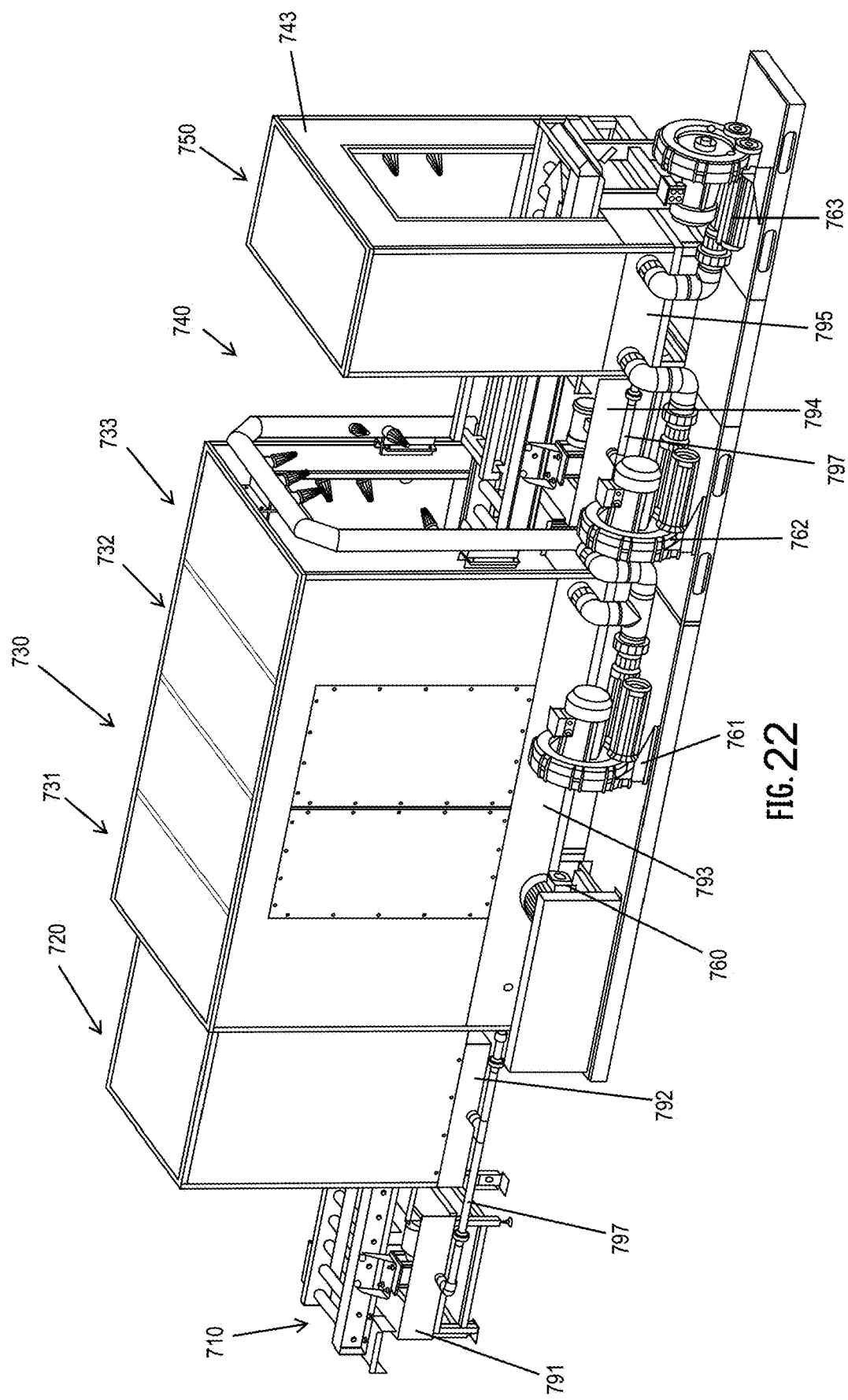
FIG. 22 is a perspective view of an embodiment of an engine cleaning apparatus in accordance with disclosed aspects and features.

FIG. 21 illustrates a perspective view of an embodiment of the engine disassembly line 500 showing an engine transport cart apparatus 590. The engine transport cart 590 may include a cart base 591 and a roller frame 596, which may be positioned on the cart base 591. Rollers 598 may be positioned in and attached to the roller frame 596.

The vehicle disassembly system of the present invention may further comprise an engine cleaning apparatus 700. Referring now to FIGS. 22-27, an embodiment of an engine cleaning apparatus 700 is shown. The engine cleaning apparatus 700 may include a conveyor 710, a first enclosure 720, a second enclosure 730, an inspection zone 740, a third enclosure 750, a water pump 760, a first dryer 761, a second dryer 762, and a third dryer 763. The conveyor 710 may be configured to move items (e.g., a vehicle engine) from a first end of the conveyor 710 to a second end of a conveyor 710 (e.g., through the first enclosure 720, the second enclosure 730, and the third enclosure 740). The conveyor 710 may be a roller conveyor system. The engine cleaning apparatus 700 is preferably located adjacent to the engine disassembly line 500 to allow an engine to be easily transported from the engine unloading stations 570a, 570b to the engine cleaning apparatus 700. In a preferred embodiment of a vehicle recycling plant housing the vehicle disassembly system of the present invention, the first end of the conveyor 710 of the engine cleaning apparatus 700 is located proximate to (i.e., within 100 feet) of the engine unloading stations 570a, 570b of the engine disassembly line 500.

A vehicle engine may be washed and cleaned in one or more of the enclosures 720, 730, 740. For example, the conveyor 710 may transport a vehicle engine through a first enclosure 720 and to a second enclosure 730, where a washing zone 731 may be located. In washing zone 731, the engine may be washed by fluid(s) provided by a water pump 760. The first enclosure 720 may act as a buffer area to keep fluids (e.g., water, cleaning solution, etc.) contained within the first enclosure 710 or within the second enclosure 720 (e.g., to keep fluids from getting on the floor). First enclosure catch basin 792 or second enclosure catch 793 may catch the fluid used to wash the vehicle engine. Drain piping 797 connected to a drip tray 791 and to basins 793, 792 may transport fluid from basin 793 to basin 792, from basin 792 to drip tray 791, and/or from basin 793 to drip tray 791.

The second enclosure 730 may also include a drip drying zone 732 and a blow drying zone 733. A wet engine may drip dry excess fluid in the drip drying zone 732, and the excess fluid may, for example, drain in the drain piping 797. One or more dryers 761 and 762 may blow air onto the engine in in the blow drying zone 733 to dry the engine, and excess fluid may drain, for example, in the drain piping 797.

In the inspection zone 740, users, tools, and/or computing device may inspect a washed engine to determine whether the engine has been adequately cleaned. The inspection zone 740 may be an open zone and may be separate from one of the enclosures 720, 730, 750. For example, the inspection zone 740 may have no ceiling and/or one or more wall structures in immediate proximity and/or along one or more portions of the inspection zone 740. Excess fluid from the inspection zone 740 may, for example, drain in the catch basin 794 and in drain piping 797. If the engine needs to be dried again (e.g., after inspection), the engine may be dried by a third dryer 763 in the third enclosure 750. Excess fluid from the third enclosure 750 may, for example, drain in the catch basin 795 and in drain piping 797.

Figure 23:
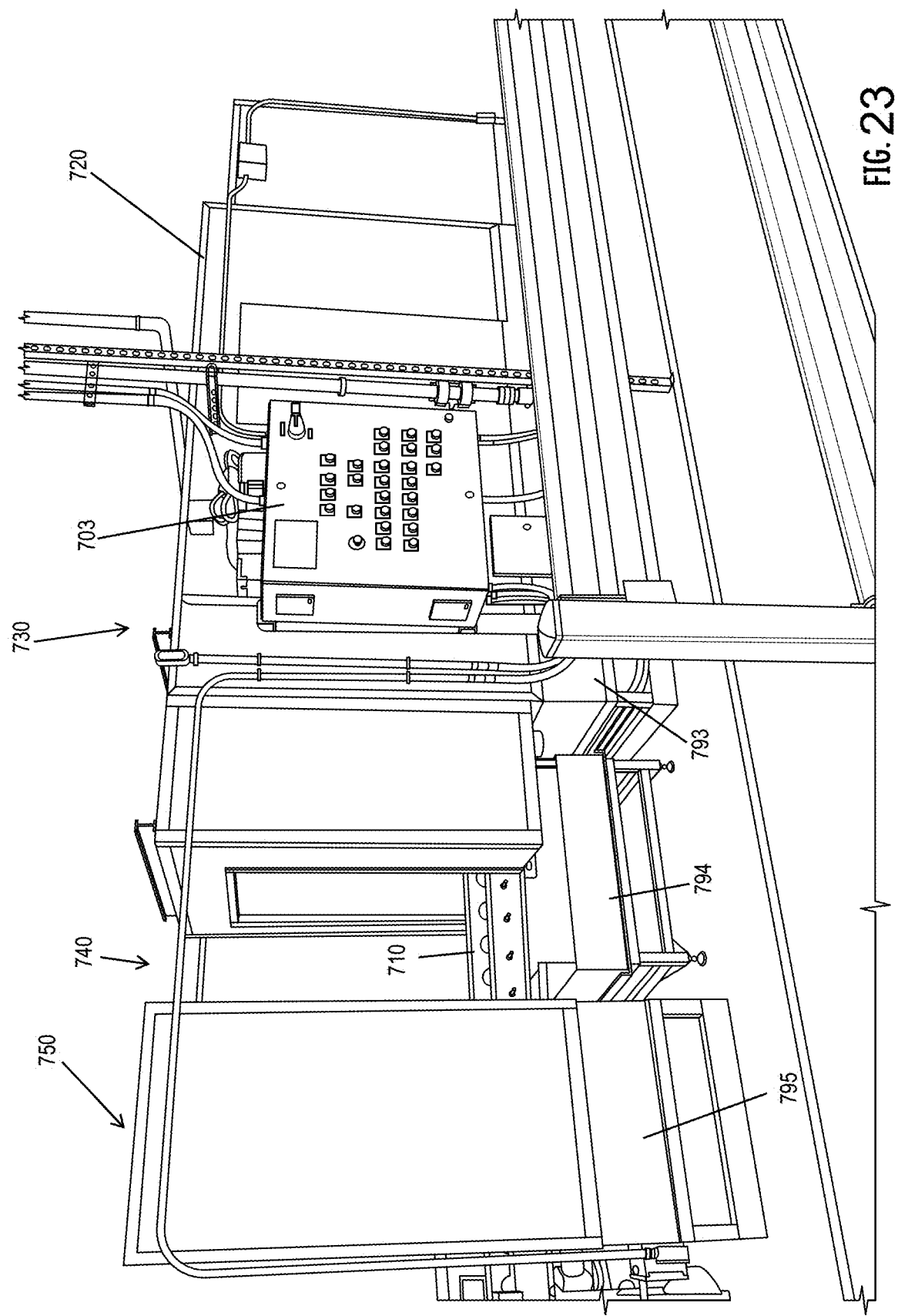
FIG. 23 is a side perspective view of an embodiment of the engine cleaning apparatus as shown in FIG. 22 in accordance with disclosed aspects and features.

FIG. 23 illustrates a side perspective view of an embodiment of the engine cleaning apparatus 700. As shown in FIG. 23, the engine cleaning apparatus 700 may include a control panel or device 703, which may be configured to control one or more components of the engine cleaning apparatus 700. The control panel 703 may be attached to the engine cleaning apparatus 700, such as positioned adjacent to or on one of the enclosures 720, 730, 750.

Figure 24:
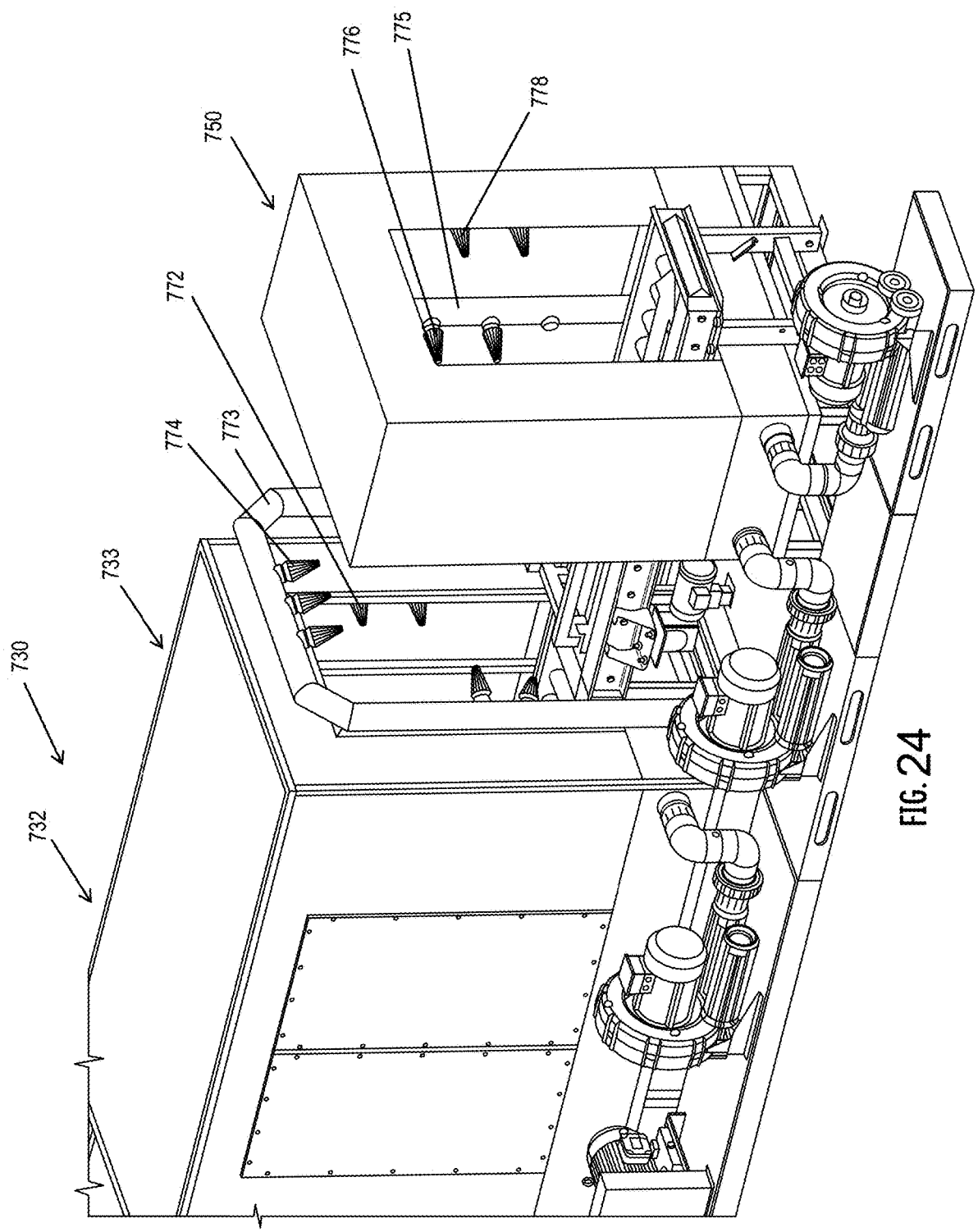
FIG. 24 is a perspective view of an embodiment of the engine cleaning apparatus as shown in FIG. 22 in accordance with disclosed aspects and features.

FIG. 24 illustrates a perspective view of an embodiment of the engine cleaning apparatus 700. As shown in FIG. 24, the blow drying zone 733 of the second enclosure 730 may include a first dryer arch 771, one or more dyer nozzles 772 attached to the first dyer arch 771, a second dyer arch 773, and one or more dryer nozzles 774 attached to the second dryer arch 773. The dryer nozzles 772, 774 may blow air over and on an item (e.g., a vehicle engine) inside and/or moving through the second enclosure 730. One or more dryers 761 and 762 may supply air to the nozzles 772, 774. In some embodiments, a dryer arch, such as the second dryer arch 773, may be attached to and located outside of the second enclosure 730, such as being located between the second enclosure 730 and the third enclosure 750.

Also shown in FIG. 24, the third enclosure 750 may include a third dryer arch 775 and one or more nozzles 776, 778 attached to the third dryer arch 775. The dryer nozzles 776, 778 may blow air over and on an item (e.g., a vehicle engine) inside and/or moving through the third enclosure 750. Dryer 763 may supply air to nozzles 776, 778. In some embodiments, the third enclosure 750 may act to further dry a vehicle engine after the engine is inspected in the inspection zone 740 (e.g., determined to be not adequately dry). In some embodiments, the third enclosure 750 may act to further wash and dry a vehicle engine after the engine is inspected in the inspection zone 740.

Figure 25:
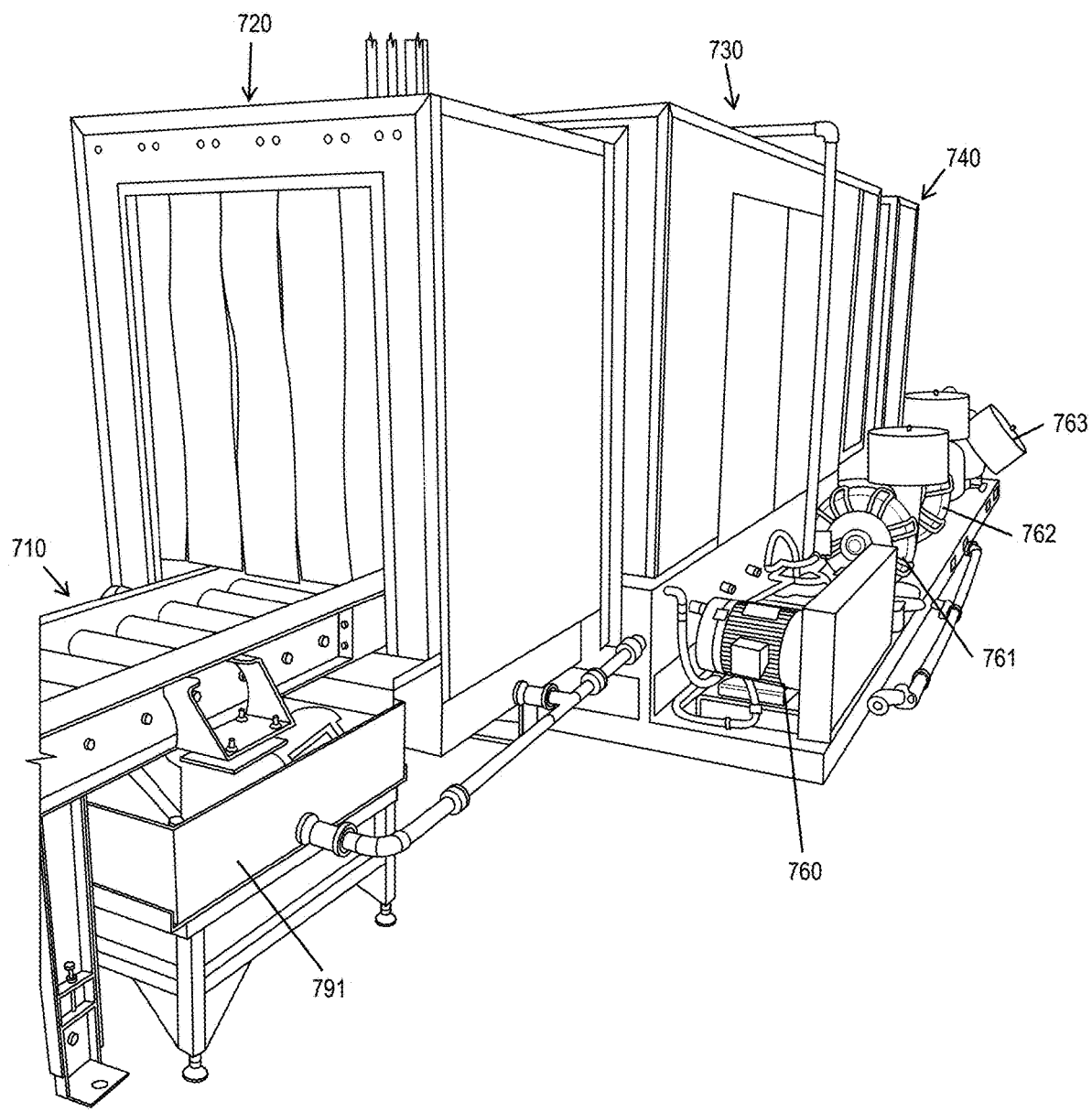
FIG. 25 is a front perspective view of an embodiment of the engine cleaning apparatus as shown in FIG. 22 in accordance with disclosed aspects and features.

FIG. 25 illustrates a front perspective view of an embodiment of the engine cleaning apparatus 700. As shown in FIG. 25, the first enclosure 720 may include an entrance with a strip curtain 721. The strip curtain 721 may act to diminish the amount of fluid that may splash outside of the enclosure 720.

Figure 26:
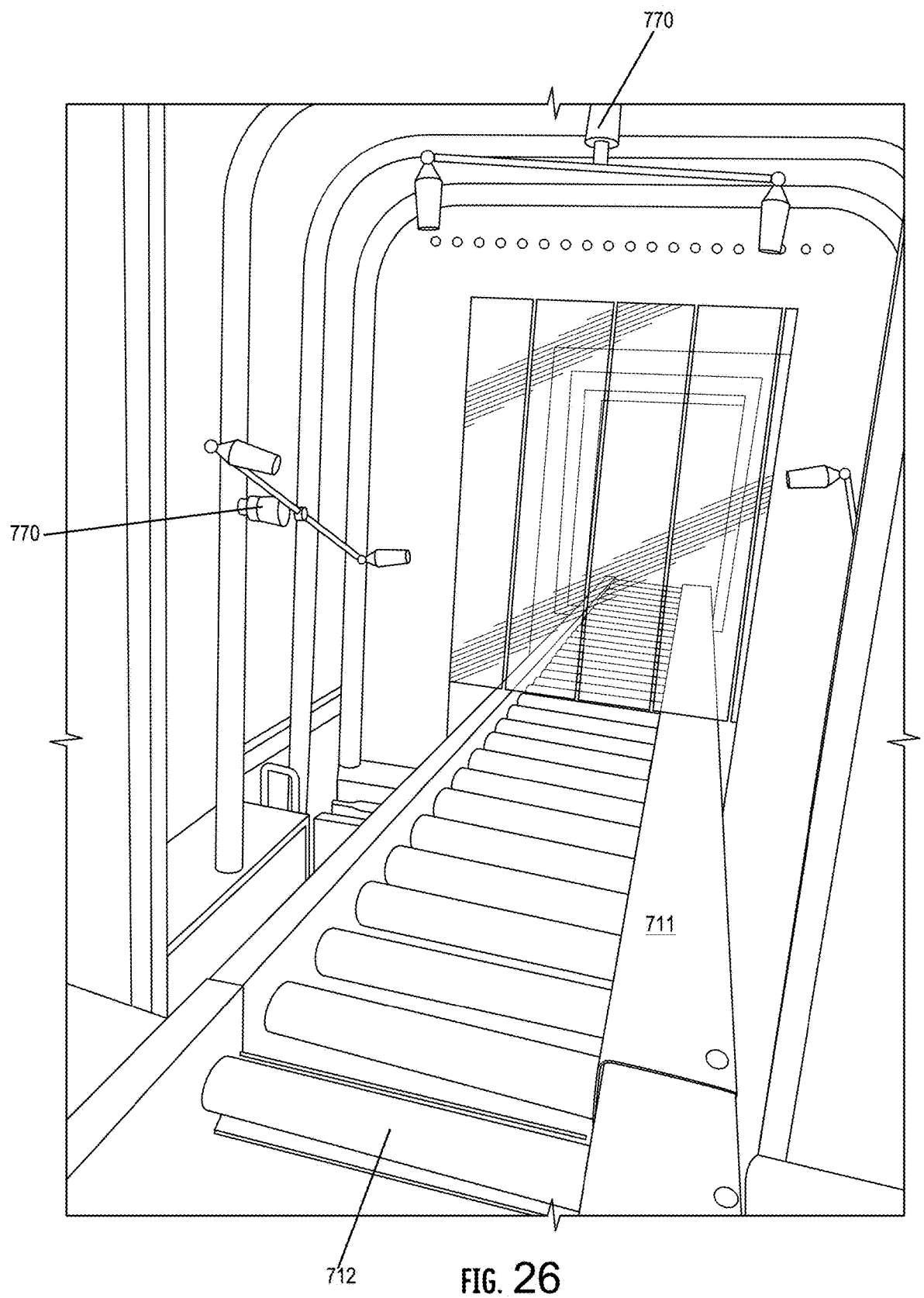
FIG. 26 is an internal view of an embodiment of an engine cleaning apparatus as shown in FIG. 22 showing a second enclosure in accordance with disclosed aspects and features.

FIG. 26 illustrates an internal view of an embodiment of the second enclosure 730. As shown in FIG. 26, water jets 770 may be attached to or on a first side, a second side, and on a top side of the second enclosure 730. The water jets 770 may be configured to spray fluid onto an item placed on the conveyor 710. In some embodiments, water jets 770 may include or be water nozzles. According to some aspects, water jets 770 may include a rotating nozzle arm. In one example, an engine may roll down the conveyor 710 on rollers 712 and may be guided by sidewall guides 711. The sidewall guides 711 may be raised above the rollers 712. In some embodiments, the rollers 712 may be chain-driven rollers. The length of the rollers 712 may be adequate for fitting a vehicle engine, such as measuring less than three feet, less than four feet, less than five feet, and the like in length.

Figure 27A:
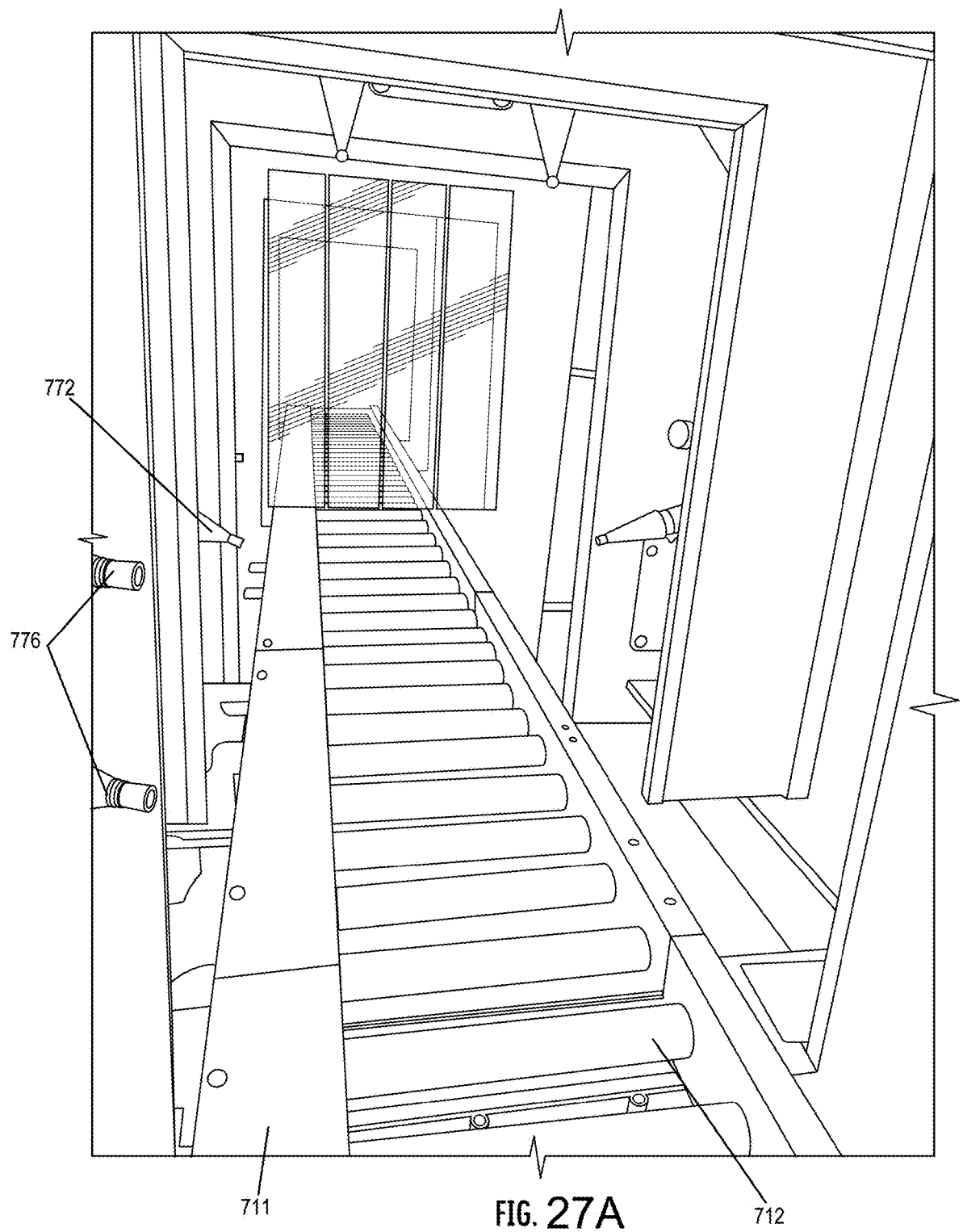
FIGS. 27A and 27B are rear views of an embodiment of an engine cleaning apparatus as shown in FIG. 22 showing a second enclosure and a third enclosure in accordance with disclosed aspects and features.
Figure 27B:
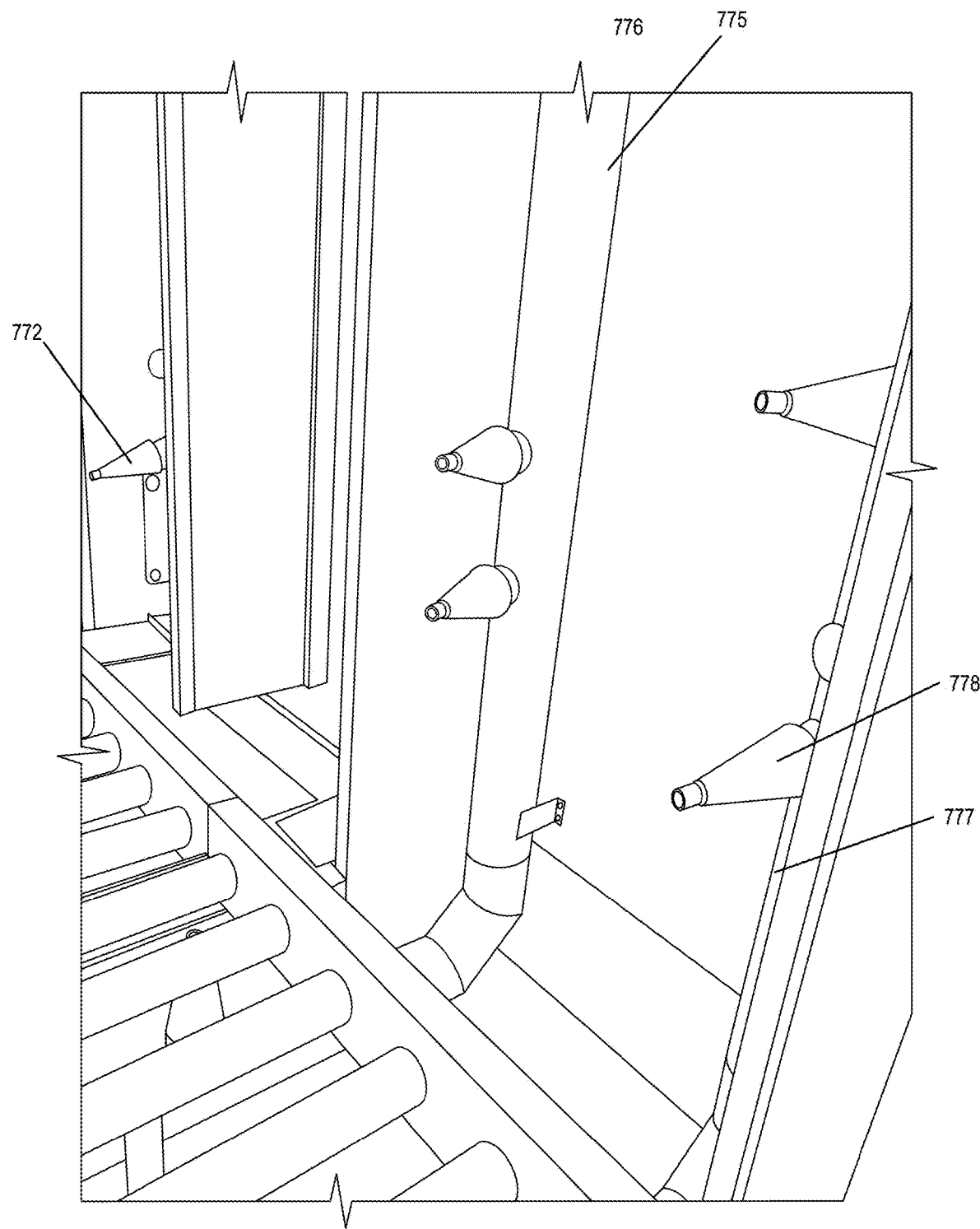

FIGS. 27A and 27B illustrate rear views of an embodiment of the second enclosure 730 and the third enclosure 750. As shown, the nozzles 772, 774, 776, 778 may be placed at separate locations or zones along the conveyor 710. According to some aspects, nozzles 772, 774, 776, 778 may include a rotating nozzle arm.

The foregoing description of the embodiments of the invention has been presented for purposes of illustration and description. It is not intended to be exhaustive or to limit the invention to the precise form(s) disclosed, and many modifications and other embodiments of the invention set forth in this disclosure will be appreciated by one skilled in the art having the benefit of this disclosure. The embodiments were chosen and described in order to explain the principles of the invention and its practical application to enable one skilled in the art to utilize the invention in various embodiments and with various modifications as are suited to the particular use contemplated. The embodiments shown in the drawings and described above are exemplary of numerous embodiments that may be made within the scope of the appended claims. It is contemplated that numerous other configurations may be used, and the material of each component may be selected from numerous materials other than those specifically disclosed.

What is claimed is:

1. A vehicle disassembly system for recycling end-of-life vehicles, the system comprising:
   a) an engine disassembly line;
   b) an engine cleaning apparatus positioned adjacent to the engine disassembly line, the engine cleaning apparatus comprising:
      i) a roller conveyor having a first portion and a second portion;
      ii) a main enclosure extending around the first portion of the roller conveyor, the main enclosure defining a washing zone comprising a plurality of spray nozzles, a drip zone adjacent to the washing zone, and a first dryer zone adjacent to the drip zone and comprising a plurality of blower nozzles, wherein the roller conveyor is configured to transmit an engine sequentially through the washing zone, the drip zone, and the first dryer zone; and
      iii) a secondary enclosure extending around the second portion of the roller conveyor, the secondary enclosure defining a second dryer zone, wherein the secondary enclosure is spatially separated from the main enclosure to define an open inspection zone formed between the main enclosure and the secondary enclosure.

2. The vehicle disassembly system of claim 1, wherein the main enclosure includes a catch basin positioned below the roller conveyor for collecting water discharged from the plurality of spray nozzles.

3. The vehicle disassembly system of claim 2, wherein the engine disassembly line comprises:
   a) an overhead track support frame comprising a track; and
   b) a plurality of work tables positioned below the track.

4. The vehicle disassembly system of claim 3, wherein the engine disassembly line further comprises:
   a) a trolley assembly suspended from the track;
   b) at least one loading table positioned below a first portion of the track, wherein the last least one loading table is configured to support an engine while the engine is being attached to the trolley assembly; and
   c) at least one unloading table positioned below a second portion of the track, wherein the at least one unloading table is configured to support the engine while the engine is being detached from the trolley assembly.

5. The vehicle disassembly system of claim 2, wherein the engine disassembly line comprises:
   a) an overhead track support frame comprising a track;
   b) a trolley assembly suspended from the track;
   c) at least one loading table positioned below a first portion of the track, wherein the last least one loading table is configured to support an engine while the engine is being attached to the trolley assembly;
   d) a plurality of work tables positioned below the track; and
   e) at least one unloading table positioned below a second portion of the track, wherein the at least one unloading table is configured to support the engine while the engine is being detached from the trolley assembly.

6. The vehicle disassembly system of claim 5, wherein the trolley assembly further comprises: a trolley coupled to the track; an engine support beam suspended from the trolley; and support hooks extending downwardly from the support beam.

7. The vehicle disassembly system of claim 1, further comprising a de-pollution and disassembly line adjacent to the engine disassembly line.

8. The vehicle disassembly system of claim 7, wherein the de-pollution and disassembly line comprises:
   i) a conveyor apparatus comprising a conveyor track;
   ii) two or more fluid contaminant stations positioned along a first portion of the conveyor track, the plurality of fluid contaminant stations adapted to remove one or more fluids from each end-of-life vehicle, wherein each fluid contaminant station is spatially separated from one another along a length of the first portion of the conveyor track;
   iii) two or more intermediate part removal stations positioned along a second portion of the conveyor track, wherein the each intermediate part removal station is spatially separated from one another along a length of the second portion of the conveyor track.

9. The vehicle disassembly system of claim 8, wherein each intermediate part removal station comprises:
   a) a left-side terminal comprising: a left-side post; a left-side work surface attached to the left-side post; a left-side bumper arm extending from the post laterally towards the conveyor track; and a left-side bumper attached to the distal end of the left-side bumper arm;
   b) a right-side terminal positioned across the conveyor track from the left-side terminal, the right-side terminal comprising: a right-side post; a right-side work surface attached to the right-side post; a right-side bumper arm extending from the post laterally towards the conveyor track; and a right-side bumper attached to the distal end of the right-side bumper arm.

10. The vehicle disassembly system of claim 8, wherein the two or more fluid contaminant stations comprises: a first fluid contaminant station fluidly connected to a first storage tank via a first fluid removal line, a second fluid contaminant station fluidly connected to a second storage tank via a second fluid removal line, and a third fluid contaminant station fluidly connected to a third storage tank via a third fluid removal line.

11. A vehicle disassembly system for recycling end-of-life vehicles, the system comprising an engine cleaning apparatus, the engine cleaning apparatus comprising:
 a) a roller conveyor having a first portion and a second portion;
 b) a main enclosure extending around the first portion of the roller conveyor, the main enclosure defining a washing zone comprising a plurality of spray nozzles, a drip zone adjacent to the washing zone, and a first dryer zone adjacent to the drip zone and comprising a plurality of blower nozzles, wherein the roller conveyor is configured to transmit an engine sequentially through the washing zone, the drip zone, and the first dryer zone; and
 c) a secondary enclosure extending around the second portion of the roller conveyor, the secondary enclosure defining a second dryer zone, wherein the secondary enclosure is spatially separated from the main enclosure to define an open inspection zone formed between the main enclosure and the secondary enclosure; and
 d) a catch basin positioned below the roller conveyor for collecting water discharged from the plurality of spray nozzles.

12. The vehicle disassembly system of claim 11, wherein the vehicle disassembly system further comprises an engine disassembly line positioned adjacent to the engine cleaning apparatus.

13. The vehicle disassembly system of claim 12, wherein the vehicle disassembly system further comprises engine disassembly line positioned adjacent to the engine cleaning apparatus.

14. The vehicle disassembly system of claim 12, wherein the engine disassembly line comprises:
 a) an overhead track support frame comprising a track; and
 b) a plurality of work tables positioned below the track.

15. The vehicle disassembly system of claim 14, wherein the engine disassembly line further comprises:
 a) a trolley assembly suspended from the track;
 b) at least one loading table positioned below a first portion of the track, wherein the last least one loading table is configured to support an engine while the engine is being attached to the trolley assembly; and
 c) at least one unloading table positioned below a second portion of the track, wherein the at least one unloading table is configured to support the engine while the engine is being detached from the trolley assembly.

16. The vehicle disassembly system of claim 12, wherein the engine disassembly line comprises:
 a) an overhead track support frame comprising a track;
 b) a trolley assembly suspended from the track;
 c) at least one loading table positioned below a first portion of the track, wherein the last least one loading table is configured to support an engine while the engine is being attached to the trolley assembly;
 d) a plurality of work tables positioned below the track; and
 e) at least one unloading table positioned below a second portion of the track, wherein the at least one unloading table is configured to support the engine while the engine is being detached from the trolley assembly.

17. The vehicle disassembly system of claim 16, wherein the trolley assembly further comprises: a trolley coupled to the track; an engine support beam suspended from the trolley; and support hooks extending downwardly from the support beam.

18. The vehicle disassembly system of claim 12, further comprising a de-pollution and disassembly line adjacent to the engine disassembly line.

19. The vehicle disassembly system of claim 18, wherein the de-pollution and disassembly line comprises:
 i) a conveyor apparatus comprising a conveyor track;
 ii) two or more fluid contaminant stations positioned along a first portion of the conveyor track, the plurality of fluid contaminant stations adapted to remove one or more fluids from each end-of-life vehicle, wherein each fluid contaminant station is spatially separated from one another along a length of the first portion of the conveyor track;
 iii) two or more intermediate part removal stations positioned along a second portion of the conveyor track, wherein the each intermediate part removal station is spatially separated from one another along a length of the second portion of the conveyor track.

20. The vehicle disassembly system of claim 19, wherein each intermediate part removal station comprises:
 a) a left-side terminal comprising: a left-side post; a left-side work surface attached to the left-side post; a left-side bumper arm extending from the post laterally towards the conveyor track; and a left-side bumper attached to the distal end of the left-side bumper arm;
 b) a right-side terminal positioned across the conveyor track from the left-side terminal, the right-side terminal comprising: a right-side post; a right-side work surface attached to the right-side post; a right-side bumper arm extending from the post laterally towards the conveyor track; and a right-side bumper attached to the distal end of the right-side bumper arm.

\* \* \* \* \*